US011610321B2

(12) United States Patent
Sun et al.

(10) Patent No.: US 11,610,321 B2
(45) Date of Patent: Mar. 21, 2023

(54) TARGET TRACKING METHOD AND APPARATUS, STORAGE MEDIUM, AND ELECTRONIC DEVICE

(71) Applicant: Tencent Technology (Shenzhen) Company Limited, Shenzhen (CN)

(72) Inventors: Chong Sun, Shenzhen (CN); Yuxuan Sun, Shenzhen (CN); Huchuan Lu, Shenzhen (CN); Xiaoyong Shen, Shenzhen (CN); Yuwing Tai, Shenzhen (CN); Jiaya Jia, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 140 days.

(21) Appl. No.: 17/365,893

(22) Filed: Jul. 1, 2021

(65) Prior Publication Data

US 2021/0327076 A1    Oct. 21, 2021

Related U.S. Application Data

(63) Continuation of application No. PCT/CN2020/087041, filed on Apr. 26, 2020.

(30) Foreign Application Priority Data

May 10, 2019 (CN) .......................... 201910391497.7

(51) Int. Cl.
 *G06T 7/246* (2017.01)
 *G06V 10/40* (2022.01)
(52) U.S. Cl.
 CPC .............. *G06T 7/248* (2017.01); *G06V 10/40* (2022.01); *G06T 2207/10016* (2013.01)

(58) Field of Classification Search
 None
 See application file for complete search history.

(56) References Cited

U.S. PATENT DOCUMENTS

| 2019/0005655 | A1 | 1/2019 | Lim et al. |
| 2019/0114804 | A1 | 4/2019 | Sundaresan et al. |
| 2019/0156144 | A1* | 5/2019 | Li ........................... G06V 10/82 |

FOREIGN PATENT DOCUMENTS

| CN | 107240122 A | 10/2017 |
| CN | 108550126 A | 9/2018 |

(Continued)

OTHER PUBLICATIONS

Tencent Technology, WO, PCT/CN2020/087041, Jul. 17, 2020, 5 pgs.

(Continued)

*Primary Examiner* — Vikkram Bali
(74) *Attorney, Agent, or Firm* — Morgan, Lewis & Bockius LLP

(57) ABSTRACT

This application provides a target tracking method, including: obtaining a plurality of consecutive picture frames of a target video, and setting a tracked target region of an $n^{th}$ picture frame; performing a feature extraction operation on the tracked target region of the $n^{th}$ picture frame, to obtain a feature map of the tracked target region; calculating a weighted filter corresponding to the input feature map according to a correlation filter algorithm and a mean pooling constraint condition; calculating an output response of an $(n+1)^{th}$ picture frame by using the weighted filter and an input feature map of the $(n+1)^{th}$ picture frame in the plurality of consecutive picture frames, and determining a tracked target region of the $(n+1)^{th}$ picture frame according to the output response of the $(n+1)^{th}$ picture frame, until tracked target regions of all the consecutive picture frames (Continued)

are obtained. This application improves precision and effectiveness of target tracking.

20 Claims, 7 Drawing Sheets

(56) References Cited

FOREIGN PATENT DOCUMENTS

| CN | 109448024 A | 3/2019 |
|----|-------------|--------|
| CN | 109543615 A | 3/2019 |
| CN | 110148157 A | 8/2019 |

OTHER PUBLICATIONS

Tencent Technology, IPRP, PCT/CN2020/087041, Nov. 16, 2021, 6 pgs.
David S. Bolme et al., "Visual Object Tracking Using Adaptive Correlation Filters", Computer Science Department, Colorado State University, IEEE Computer Society Conference on Computer Vision and Pattern Recognition, Aug. 5, 2010, 11 pgs.
Tencent Technology, ISR, PCT/CN2020/087041, Jul. 17, 2020, 2 pgs.
Extended European Search Report, EP20805061.7, May 23, 2022, 9 pgs.
Hamed Kiani Galoogahi et al., "Learning Background-Aware Correlation Filters for Visual Tracking", Cornell University Library, Mar. 14, 2017, XP080756683 10 pgs.
Kenan Dai et al., "Visual Tracking via Adaptive Spatially-Regularized Correlation Filters", 2019 IEEE/CVF Conference on Computer Vision and Pattern Recognition (CVPR), IEEE, Jun. 15, 2019, XP033686750 10 pgs.
Martin Danelljan et al., "Learning Spatially Regularized Correlation Filters for Visual Tracking", Computer Vision Laboratory, Linkoping University, Sweden, Aug. 19, 2016, XP080721106, 9 pgs.
Ross Girshick, "Fast R-CNN", Dec. 7, 2015, XP055646790, 9 pgs.
Yuxuan Sun et al., "ROI Pooled Correlation Filters for Visual Tracking", 2019 IEEE/CVF Conference on Computer Vision and Pattern Recognition (CVPR), IEEE, Jun. 15, 2019, XP033687066, 9 pgs.

\* cited by examiner

US 11,610,321 B2

TARGET TRACKING METHOD AND APPARATUS, STORAGE MEDIUM, AND ELECTRONIC DEVICE

CROSS-REFERENCE TO RELATED APPLICATIONS

This application is a continuation application of PCT Patent Application No. PCT/CN2020/087041, entitled "TARGET TRACKING METHOD AND APPARATUS, STORAGE MEDIUM, AND ELECTRONIC DEVICE" filed on Apr. 26, 2020, which claims priority to Chinese Patent Application No. 201910391497.7, entitled "PICTURE TARGET TRACKING METHOD AND APPARATUS, STORAGE MEDIUM, AND ELECTRONIC DEVICE" and filed on May 10, 2019, all of which are incorporated herein by reference in their entirety.

FIELD OF THE TECHNOLOGY

This application relates to the field of image data processing, and in particular, to a target tracking method and apparatus, a storage medium, and an electronic device.

BACKGROUND OF THE DISCLOSURE

Target tracking is an operation for positioning a manually designated target object in consecutive frames of a video. For decades, target tracking has been widely applied to fields of automatic driving, human-computer interaction, and behavior recognition. However, due to limited training data, target tracking is still a very challenging task.

A correlation filter-based target tracking algorithm is one of current target tracking methods, and correlation filters are characterized by quickly obtaining samples through circular convolution. In 2015, Danelljan et al. proposed to add a regularization item on a filter, to suppress edge information, and facilitate that the filter performing learning based on central regions of targets, thereby effectively resolving an edge effect. In 2017, the learning background-aware correlation filters (BACF) for visual tracking algorithm provided another feasible method for resolving the edge effect, and actual training samples are generated, which greatly improves an identification capability of the learning filters.

However, a large amount of parameters need to be introduced to complex formulas in the correlation filter-based target tracking algorithm in the related art, and with a limited quantity of samples, it is very difficult, if not impossible, to perform a matching operation, resulting in parameter over-fitting. If parameter reduction is performed by using an ordinary pooling operation, the quantity of samples is also reduced, which still cannot effectively resolve the technical problem of imbalance between a quantity of the parameters and a quantity of samples.

SUMMARY

This application provides a target tracking method and a target tracking apparatus, which not only avoids parameter over-fitting, but also improves the robustness of a corresponding correlation filter model, thereby improving the precision and the effectiveness of target tracking.

An embodiment of this application provides a target tracking method performed at an electronic device, the method including:

obtaining a plurality of consecutive picture frames of a target video, and setting an $n^{th}$ tracked target region corresponding to an $n^{th}$ picture frame in the plurality of consecutive picture frames, n being a positive integer;

performing a feature extraction operation on the $n^{th}$ tracked target region, to obtain an $n^{th}$ regional input feature map corresponding to the $n^{th}$ tracked target region, the $n^{th}$ regional input feature map including a plurality of feature channels;

calculating an $n^{th}$ weighted filter corresponding to the $n^{th}$ regional input feature map according to a correlation filter algorithm and a mean pooling constraint condition, the $n^{th}$ weighted filter including a filter weight corresponding to each feature channel in the $n^{th}$ regional input feature map;

calculating an $(n+1)^{th}$ output response by using the $n^{th}$ weighted filter and an $(n+1)^{th}$ picture frame input feature map, and determining an $(n+1)^{th}$ tracked target region corresponding to an $(n+1)^{th}$ picture frame according to the $(n+1)^{th}$ output response, the $(n+1)^{th}$ picture frame input feature map being an input feature map of the $(n+1)^{th}$ picture frame in the plurality of consecutive picture frames; and performing feature extraction on the $(n+1)^{th}$ tracked target region, to obtain an $(n+1)^{th}$ regional input feature map corresponding to the $(n+1)^{th}$ tracked target region, and calculating an $(n+1)^{th}$ weighted filter corresponding to the $(n+1)^{th}$ regional input feature map, until tracked target regions of all the consecutive picture frames are obtained.

An embodiment of this application provides a target tracking apparatus, including:

a tracked target region setting module, configured to obtain a plurality of consecutive picture frames of a target video, and set an $n^{th}$ tracked target region corresponding to an $n^{th}$ picture frame in the plurality of consecutive picture frames, n being a positive integer;

a feature extraction module, configured to perform a feature extraction operation on the $n^{th}$ tracked target region, to obtain an $n^{th}$ regional input feature map corresponding to the $n^{th}$ tracked target region, the $n^{th}$ regional input feature map including a plurality of feature channels;

a weighted filter calculation module, configured to calculate an $n^{th}$ weighted filter corresponding to the $n^{th}$ regional input feature map according to a correlation filter algorithm and a mean pooling constraint condition, the $n^{th}$ weighted filter including a filter weight corresponding to each feature channel in the $n^{th}$ regional input feature map;

a tracked target region determining module, configured to calculate an $(n+1)^{th}$ output response by using the $n^{th}$ weighted filter and an $(n+1)^{th}$ picture frame input feature map, and determine an $(n+1)^{th}$ tracked target region corresponding to an $(n+1)^{th}$ picture frame according to the $(n+1)^{th}$ output response, the $(n+1)^{th}$ picture frame input feature map being an input feature map of the $(n+1)^{th}$ picture frame in the plurality of consecutive picture frames; and a counting module, configured to perform a counting operation on the feature extraction operation.

In the target tracking apparatus provided in this application, the correlation filter model creation unit includes:

a binary mask setting subunit, configured to set a binary mask for the $n^{th}$ weighted filter, to reduce a filter weight of a weighted filter corresponding to a region other than the $n^{th}$ tracked target region.

In the target tracking apparatus provided in this application, the correlation filter model creation unit includes:

a regularization weight setting subunit, configured to set a regularization weight for the $n^{th}$ weighted filter, to increase a filter weight of the $n^{th}$ weighted filter in a central part of the $n^{th}$ tracked target region.

An embodiment of this application further provides a non-transitory computer-readable storage medium, storing processor-executable instructions, the processor-executable instructions being executed by one or more processors of an electronic device to perform the target tracking method.

An embodiment of this application further provides an electronic device, including a processor and a memory, the memory storing a plurality of computer programs, the processor invoking the computer programs to perform the target tracking method.

Compared with the related art, in the target tracking method and apparatus, the storage medium, and the electronic device in this application, a mean pooling operation is performed on filter weights corresponding to different feature channels of an input feature map, to reduce a quantity of algorithm parameters. In addition, a reduction operation does not need to be performed on a tracked target region, thereby ensuring a quantity of training sample features of the input feature map, avoiding occurrence of parameter overfitting, and improving the precision and the effectiveness of target tracking. Therefore, the technical problem of parameter over-fitting or relatively low tracking precision in the target tracking method and the target tracking apparatus is effectively resolved.

DESCRIPTION OF EMBODIMENTS

Figure 1:
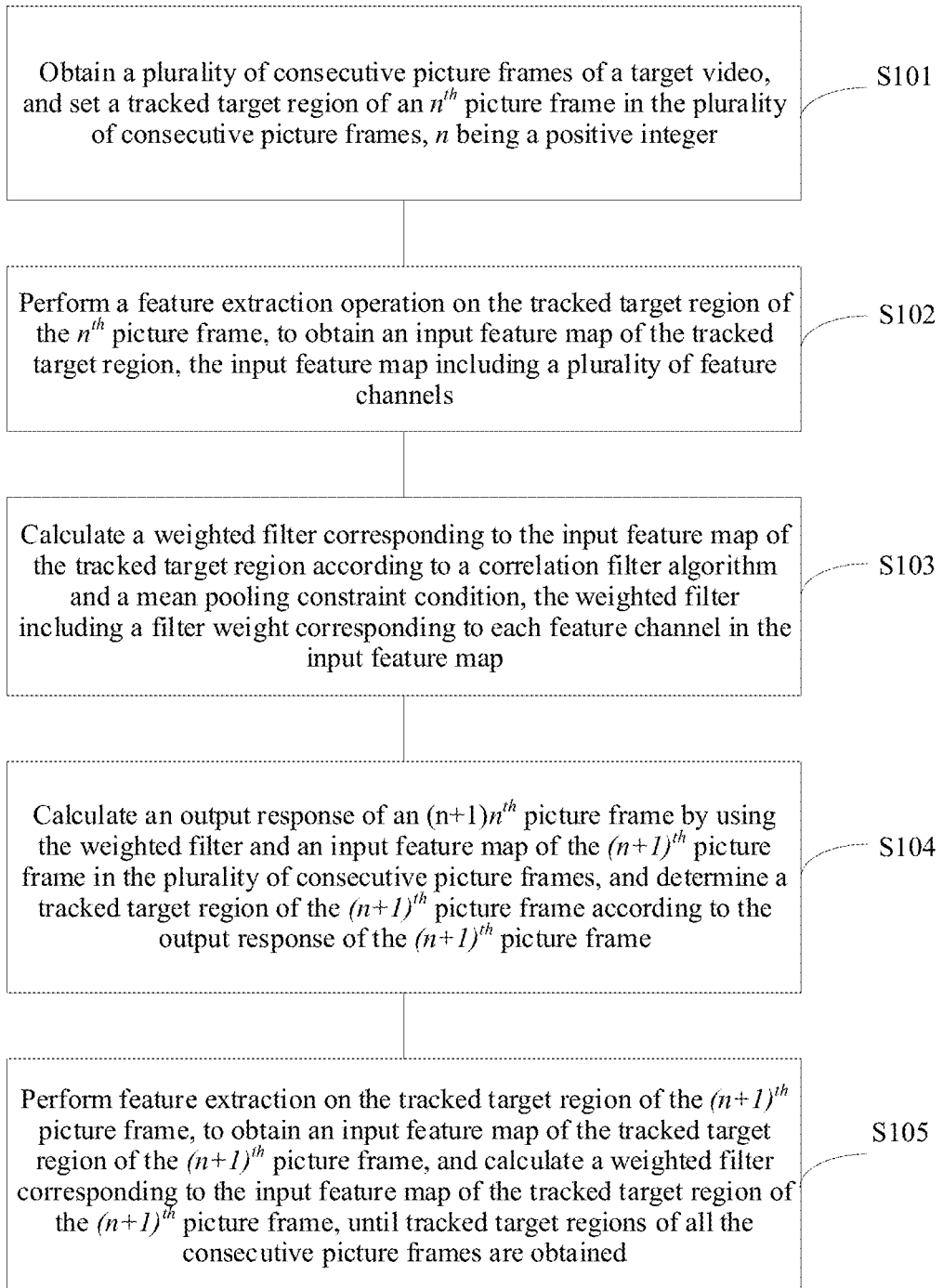
FIG. 1 is a flowchart of an embodiment of a target tracking method according to this application.

Referring to the drawings, same component symbols represent same components. A principle of this application is described by using examples in which this application is implemented in proper computing environments. The following descriptions are optional embodiments of this application based on the examples, and are not to be construed as a limitation to other optional embodiments of this application that are not described herein in detail.

In the following description, the optional embodiments of this application are described with reference to steps and symbols of operations that are performed by one or more computers, unless otherwise indicated. Therefore, these steps and operations may be learned from the description, where it is mentioned for a plurality of times that the steps and operations are performed by a computer, including that the steps and operations are manipulated by a computer processing unit of an electronic signal that represents data in a structured pattern. This manipulation transforms the data or maintains it at locations in the memory system of the computer, which reconfigures or otherwise alters the operation of the computer in a manner well understood by a person skilled in the art. The data structures where data is maintained are physical locations of the memory that have particular properties defined by the format of the data. However, while the principle of this application is being described in the foregoing text, it is not meant to be limiting as a person skilled in the art will appreciate that the various steps and operations described hereinafter may be implemented in hardware.

The target tracking method and the target tracking apparatus in this application may be disposed in any electronic device, to perform a tracking operation on a designated object or a specific object in a video picture. The electronic device includes, but is not limited to, a wearable device, a head-mounted device, a healthcare platform, a personal computer, a server computer, a handheld or laptop device, a mobile device (for example, a mobile phone, a personal digital assistant (PDA), a media player and the like), a multiprocessor system, a consumer electronic device, a mini-computer, a mainframe computer, a distributed computing environment including any of the foregoing system or device, and the like. The electronic device may be a picture processing terminal or a picture processing server. A user may accurately determine a designated object or a specific object in consecutive picture frames of a video by using the electronic device, so as to effectively track the designated object or the specific object in the video in a high precision manner.

FIG. 1 is a flowchart of an embodiment of a target tracking method according to this application. The target tracking method in this embodiment may be implemented by using the foregoing electronic device. The target tracking method in this embodiment may include the following steps:

Step S101. Obtain a plurality of consecutive picture frames of a target video, and set a tracked target region of an $n^{th}$ picture frame in the plurality of consecutive picture frames, n being a positive integer.

Because the tracked target region is a tracked target region corresponding to the $n^{th}$ picture frame, the tracked target region may be used as an $n^{th}$ tracked target region.

Step S102. Perform a feature extraction operation on the tracked target region of the $n^{th}$ picture frame, to obtain an input feature map of the tracked target region, the input feature map including a plurality of feature channels.

Because the tracked target region is the $n^{th}$ tracked target region, the input feature map is an input feature map corresponding to the $n^{th}$ tracked target region, and the input feature map indicates features of the tracked target region, the input feature map may be used as an $n^{th}$ regional input feature map.

Step S103. Calculate a weighted filter corresponding to the input feature map of the tracked target region according to a correlation filter algorithm and a mean pooling constraint condition, the weighted filter including a filter weight corresponding to each feature channel in the input feature map.

Because the input feature map is the n$^{th}$ regional input feature map, and the weighted filter is a weighted filter corresponding to the n$^{th}$ regional input feature map, the weighted filter may be used as an n$^{th}$ weighted filter.

Step S104. Calculate an output response of an (n+1)$^{th}$ picture frame by using the weighted filter and an input feature map of the (n+1)$^{th}$ picture frame in the plurality of consecutive picture frames, and determine a tracked target region of the (n+1)$^{th}$ picture frame according to the output response of the (n+1)$^{th}$ picture frame.

Because the input feature map is an input feature map corresponding to the (n+1)$^{th}$ picture frame, and the input feature map indicates features of the picture frame, the input feature map may be used as an (n+1)$^{th}$ picture frame input feature map. Because the output response is an output response corresponding to the (n+1)$^{th}$ picture frame, the output response may be used as an (n+1)$^{th}$ output response.

Step S105. Perform feature extraction on the tracked target region of the (n+1)$^{th}$ picture frame, to obtain an input feature map of the tracked target region of the (n+1)$^{th}$ picture frame, and calculate a weighted filter corresponding to the input feature map of the tracked target region of the (n+1)$^{th}$ picture frame, until tracked target regions of all the consecutive picture frames are obtained.

Because the tracked target region is a tracked target region corresponding to the (n+1)$^{th}$ picture frame, the tracked target region may be used as an (n+1)$^{th}$ tracked target region. Because the input feature map is an input feature map corresponding to the (n+1)$^{th}$ tracked target region, and the input feature map indicates features of the tracked target region, the input feature map may be used as an (n+1)$^{th}$ regional input feature map. Because the weighted filter is a weighted filter corresponding to the (n+1)$^{th}$ regional input feature map, the weighted filter may be used as an (n+1)$^{th}$ weighted filter.

The procedure of each step of the target tracking method in this embodiment are described in detail by using an example of starting to process from a 1$^{st}$ picture frame in the plurality of consecutive picture frames.

In step S101, the electronic device (such as the picture processing server) obtains a plurality of consecutive picture frames of a target video. To facilitate in performing a tracking operation on a designated object or a specific object in the target video, a 1$^{st}$ tracked target region corresponding to a 1$^{st}$ picture frame in the plurality of consecutive picture frames is set herein. The 1$^{st}$ tracked target region is a tracked target region of the 1$^{st}$ picture frame in the plurality of consecutive picture frames.

The 1$^{st}$ tracked target region herein is a picture region where the specific object or the designated object is located in the picture frame. The specific object or the designated object herein may be a preset character, an animal, a vehicle, or any moving object. In this way, corresponding tracked target regions may be found in other subsequent picture frames according to features of the tracked target region in the 1$^{st}$ picture frame.

In step S102, the electronic device performs a feature extraction operation on an n$^{th}$ tracked target region, to obtain an n$^{th}$ regional input feature map corresponding to the n$^{th}$ tracked target region, where n=1. The n$^{th}$ tracked target region is a tracked target region of an n$^{th}$ picture frame, and the n$^{th}$ regional input feature map is an input feature map of the tracked target region of the n$^{th}$ picture frame.

In some embodiments, the n$^{th}$ tracked target region may be divided into mesh regions with a size of a*a. Then, a convolution sampling operation is performed on the mesh regions with a size of a*a by using d types of convolution kernels of different sizes, to obtain the n$^{th}$ regional input feature map having d feature channels. A size of the convolution kernel is less than a size of the mesh region.

In step S103, the electronic device calculates a 1$^{st}$ weighted filter corresponding to a 1$^{st}$ regional input feature map according to a correlation filter algorithm and a mean pooling constraint condition, the 1$^{st}$ weighted filter including a filter weight corresponding to each feature channel in the input feature map. The 1$^{st}$ weighted filter is a weighted filter corresponding to the input feature map of the tracked target region of the 1$^{st}$ picture frame.

Figure 2:
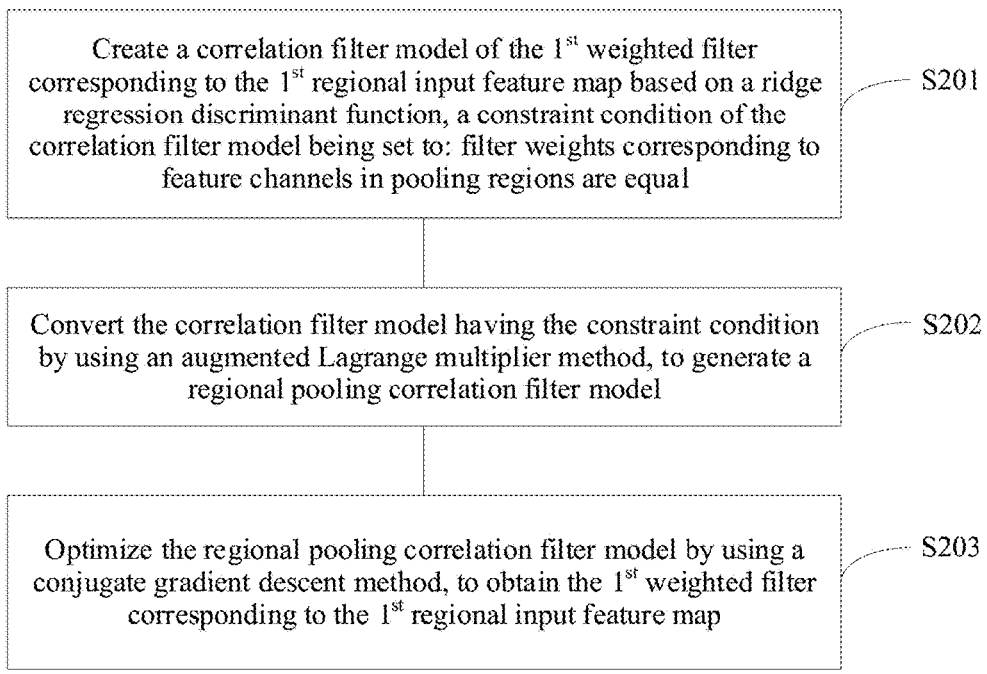
FIG. 2 is a flowchart of step S103 of an embodiment of a target tracking method according to this application.

FIG. 2 is a flowchart of step S103 of the foregoing embodiment of the target tracking method according to this application. Step S103 includes the following steps:

Step S201. The electronic device creates a correlation filter model of the 1$^{st}$ weighted filter corresponding to the 1$^{st}$ regional input feature map based on a ridge regression discriminant function, a constraint condition of the correlation filter model being set to: filter weights corresponding to feature channels in pooling regions are equal.

In some embodiments, the correlation filter model that is of the 1$^{st}$ weighted filter corresponding to the 1$^{st}$ regional input feature map and created by the electronic device based on the ridge regression discriminant function is:

$$E(\omega) = \frac{1}{2}\left\|y - \sum_{d=1}^{D}(p_d \odot \omega_d) * x_d\right\|_2^2 + \frac{\lambda}{2}\sum_{d=1}^{D}\|g_d \odot \omega_d\|_2^2$$

where y is an expected output response of the tracked target region, $x_d$ is an input feature map of a feature channel d of the tracked target region, $\omega_d$ is a filter weight corresponding to the input feature map of the feature channel d of the tracked target region, D is a quantity of the feature channels, $\rho_d$ is a binary mask of a weighted filter corresponding to the feature channel d of the tracked target region, and $g_d$ is a regularization weight of the weighted filter corresponding to the feature channel d of the tracked target region.

Output responses are target responses of convolution features extracted by deep networks of a tracked target region and a background region in a picture frame under the action of corresponding weighted filters. The expected output response is a preset output response that can distinguish the tracked target region from the background region of the picture frame. The expected output response is supposed to meet Gaussian distribution, that is, a feature of a region closer to the tracked target region corresponds to a larger target response.

The binary mask may effectively reduce a filter weight of a weighted filter corresponding to a region other than the tracked target region, thereby subsequently reducing an influence of a background region on determination of the tracked target region. That is, if a region corresponding to the input feature map is determined as a background region other than the tracked target region, a filter weight of a weighted filter related to the region is reduced by using the binary mask. The user may select whether to use the binary mask according to requirements thereof.

The regularization weight may effectively improve a filter weight of the weighted filter corresponding to the tracked target region in a central part of the tracked target region. That is, a filter weight of the central part of the tracked target region is directly increased. A picture feature in the central part of the tracked target region is of the greatest importance.

Therefore, if the filter weight of the central part of the tracked target region is increased, recognition accuracy of the tracked target region may be further improved. The user may select whether to use the regularization weight according to requirements thereof.

Subsequently, the electronic device sets that filter weights corresponding to the same feature channel in pooling regions are equal as a constraint condition of the correlation filter model.

$$\omega_d(i_\eta) = \omega_d(j_\eta), (i_\eta, j_\eta) \in P, \eta = 1, \ldots, K,$$

where P is a corresponding pooling region, and K is a quantity of equality constrains with the same weight; for example, if a quantity of features of an input feature map in the pooling region is k, $K = C_k^2$; i and j are locations corresponding to input feature maps in pooling regions.

Ranges of the pooling regions herein are set in the tracked target region (for example, set to a pixel size of 2*2 or 3*3). Adjacent pooling regions may share an edge, but ranges of adjacent pooling regions are non-overlapped. In this way, the pooling regions may be quickly set, and a quantity of algorithm parameters in the correlation filter model may be effectively reduced, thereby avoiding occurrence of parameter over-fitting, and improving the precision of target tracking.

Figure 3:
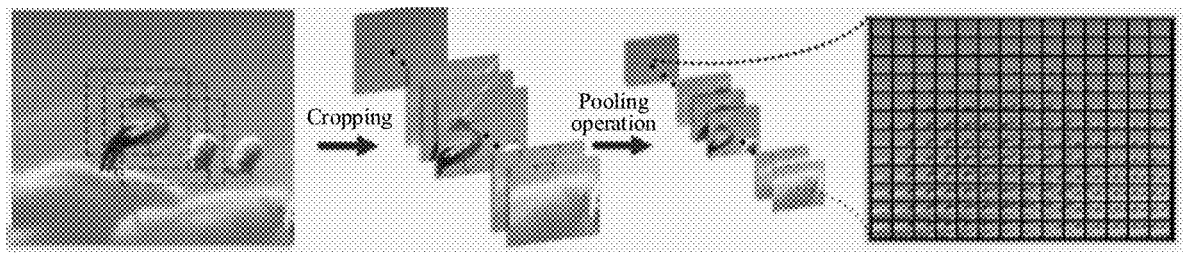
FIG. 3 is a schematic diagram of a process of processing, by a correlation filter model having a constraint condition, a tracked target region of a picture frame.

A process of processing, by the correlation filter model having the constraint condition, a tracked target region of a picture frame is shown in FIG. 3, which is equivalent to perform a cropping operation on the 1$^{st}$ tracked target region by using convolution sampling, and then perform a pooling operation on adjacent regions in the cropped feature map, that is, set filter weights in pooling regions to complete the pooling operation performed on the cropped adjacent regions, to obtain the corresponding 1$^{st}$ regional input feature map.

The pooling operation is not directly performed on the original picture frame (that is, the original picture frame is not scaled down), so that a quantity of cropped samples is relatively large. In addition, a pooling operation is performed on adjacent regions of each cropped picture region, thereby reducing algorithm parameters in the correlation filter model. Therefore, occurrence of parameter over-fitting may be effectively avoided.

Step S202. The electronic device converts, by using an augmented Lagrange multiplier method, the correlation filter model that has the constraint condition and that is obtained in step S201, to generate a regional pooling correlation filter model.

Fourier transform is first performed on the correlation filter model and the corresponding constraint condition based on Parseval's theorem. The transformed correlation filter model is as follows:

$$E(\hat{\omega}) = \frac{1}{2} \left\| \hat{y} - \sum_{d}^{D} \hat{P}_d \hat{\omega}_d \odot \hat{x}_d \right\|_2^2 + \frac{\lambda}{2} \sum_{d=1}^{D} \|\hat{G}_d \hat{\omega}_d\|_2^2; \text{ and}$$

$$V_d^1 F_d^{-1} \hat{\omega}_d = V_d^2 F_d^{-1} \hat{\omega}_d,$$

where $F_d$ is a Fourier transform matrix, $F_d^{-1}$ is an inverse Fourier transform matrix, $\hat{y}$ is a Fourier coefficient of an output response of the tracked target region, $\hat{P}_d$ is a Toeplitz matrix constructed by a Fourier coefficient of the binary mask corresponding to the input feature map of the feature channel d of the tracked target region, $\hat{\omega}_d$ is a Fourier coefficient of the filter weight corresponding to the input feature map of the feature channel d of the tracked target region, $\hat{x}_d$ is a Fourier coefficient of the input feature map of the feature channel d of the tracked target region, and $\hat{G}_d$ is a Toeplitz matrix constructed by a Fourier coefficient of the regularization weight corresponding to the input feature map of the feature channel d of the tracked target region.

$V_d^1$ and $V_d^2$ are index matrices using 1 or 0 as an entry, where $$V_d^1 F_d^{-1} \hat{\omega}_d = [\omega_d(i_1), \ldots, \omega_d(i_K)]^T; \text{ and}$$

$$V_d^2 F_d^{-1} \hat{\omega}_d = [\omega_d(j_1), \ldots, \omega_d(j_K)]^T.$$

The transformed correlation filter model may be simplified as:

$$E(\hat{\omega}) = \frac{1}{2} \left\| \hat{y} - \sum_{d=1}^{D} \hat{E}_d \hat{\omega}_d \right\|_2^2 + \frac{\lambda}{2} \sum_{d=1}^{D} \|\hat{G}_d \hat{\omega}_d\|_2^2; \text{ and}$$

$$V_d F_d^{-1} \hat{\omega}_d = 0,$$

where $\hat{E}_d = \hat{X}_d \hat{P}_d$, $\hat{X}_d = \text{diag}(\hat{x}_d(1), \ldots, \hat{x}_d(N))$ is a diagonal matrix, and $V_d = V_d^1 - V_d^2$.

Subsequently, the electronic device converts the simplified correlation filter model and the constraint condition by using an augmented Lagrange multiplier method, to generate a regional pooling correlation filter model. The regional pooling correlation filter model is as follows:

$$\Gamma(\hat{\omega}, \xi) = \frac{1}{2} \left\| \hat{y} - \sum_{d=1}^{D} \hat{E}_d \hat{\omega}_d \right\|_2^2 + \frac{\lambda}{2} \sum_{d=1}^{D} \|\hat{G}_d \hat{\omega}_d\|_2^2 + \sum_{d=1}^{D} \xi_d^T V_d F_d^{-1} \hat{\omega}_d + \frac{1}{2} \sum_{d=1}^{D} \Upsilon_d \|V_d F_d^{-1} \hat{\omega}_d\|_2^2,$$

where $\xi_d$ is a Lagrange multiplier corresponding to the feature channel d of the tracked target region, $\xi = [\xi_1^T, \ldots, \xi_D^T]^T$, and $\Upsilon_d$ is a penalty parameter.

Step S203. The electronic device optimizes the regional pooling correlation filter model obtained in step S202 by using a conjugate gradient descent method, to obtain the 1$^{st}$ weighted filter corresponding to the 1$^{st}$ regional input feature map.

An alternating direction method of multipliers is used herein to alternately obtain an optimized Lagrange multiplier and filter weight in the regional pooling correlation filter model. When the Lagrange multiplier is fixed, the corresponding filter weight may be calculated by using a conjugate gradient descent method, that is, a gradient of a target function related to the filter weight $\hat{\omega}_d$ in the regional pooling correlation filter model is calculated. When the gradient is set as a null vector, a set of linear equations is obtained:

$$(\hat{A} + F V^T \bar{V} F^{-1} + \lambda \hat{G}^H \hat{G}) \hat{\omega} = \hat{E}^H \hat{y} - F V^T \xi,$$

where $E = [E_1, E_2, \ldots, E_D]$, and $\hat{A} = E^H E$.

When the filter weight $\hat{\omega}_d$ is calculated, $\xi_d$ may be optimized by using the following formula:

$$\xi_d^{i+1} = \xi_d^i + \Upsilon_d V_d F_d^{-1} \hat{\omega}_d,$$

where $\xi_d^i$ is used for representing the Lagrange multiplier $\xi_d$ in an i$^{th}$ iterative operation.

In addition, the penalty parameter $\Upsilon_d$ is optimized:

$$\Upsilon_d^{i+1} = \min(\Upsilon_{max}, \alpha \Upsilon_d^i),$$

where i represents a quantity of iterations.

By using the foregoing iteratively optimization operation, the weighted filter corresponding to the input feature map of the tracked target region may be finally obtained, that is, $\hat{\omega}=[\hat{\omega}_1, \hat{\omega}_2, \ldots, \hat{\omega}_D]$.

In this way, the process of calculating the $1^{st}$ weighted filter according to the $1^{st}$ regional input feature map and the expected output response of the tracked target region is completed.

In some embodiments, when the $1^{st}$ regional input feature map and the expected output response are set (a specific object in the picture frame is set as a center of the tracked target region), the electronic device directly calculates the $1^{st}$ weighted filter according to the correlation filter algorithm and the mean pooling constraint condition and by using the $1^{st}$ regional input feature map and the expected output response.

In this embodiment, the process of calculating the $1^{st}$ weighted filter according to the $1^{st}$ regional input feature map and the expected output response of the tracked target region is described in detail by using an example in which n=1. Subsequently, a plurality of picture frames after the $1^{st}$ picture frame are continuously processed according to the $1^{st}$ weighted filter corresponding to the $1^{st}$ picture frame. Therefore, n is not equal to 1 anymore, but is gradually increased by 1 each time, such as n=2, 3, 4, and so on. That is, n may be greater than or equal to 2.

Therefore, when an $n^{th}$ picture frame input feature map and an $(n-1)^{th}$ weighted filter are subsequently obtained and n is greater than or equal to 2, the electronic device may calculate an $n^{th}$ output response according to the correlation filter algorithm and the mean pooling constraint condition and by using the $n^{th}$ picture frame input feature map and the $(n-1)^{th}$ weighted filter. The $n^{th}$ picture frame input feature map is an input feature map of an $n^{th}$ picture frame, the $(n-1)^{th}$ weighted filter is a weighted filter corresponding to an input feature map of a tracked target region of an $(n-1)^{th}$ picture frame, and the $n^{th}$ output response is an output response of the $n^{th}$ picture frame.

Subsequently, the electronic device obtains a location of an $n^{th}$ tracked target region, and an $n^{th}$ regional input feature map according to the $n^{th}$ output response. That is, the electronic device uses a point having a maximum output response as a center of the $n^{th}$ tracked target region, to determine the $n^{th}$ regional input feature map. The $n^{th}$ tracked target region is a tracked target region of the $n^{th}$ picture frame, and the $n^{th}$ regional input feature map is an input feature map of the tracked target region of the $n^{th}$ picture frame.

Then, the electronic device may calculate an $n^{th}$ weighted filter corresponding to the $n^{th}$ regional input feature map according to the correlation filter algorithm and the mean pooling constraint condition and by using an expected output response of the tracked target region, and the $n^{th}$ regional input feature map. The $n^{th}$ weighted filter is a weighted filter corresponding to the input feature map of the tracked target region of the $n^{th}$ picture frame. This step is similar to the foregoing process of calculating the $1^{st}$ weighted filter.

To further improve the accuracy of the calculated $n^{th}$ weighted filter, the electronic device may calculate the $n^{th}$ weighted filter according to the correlation filter algorithm and the mean pooling constraint condition and by using an expected output response of the tracked target region, the $n^{th}$ regional input feature map, and input feature maps of tracked target regions of a plurality of picture frames before the $n^{th}$ picture frame.

In some embodiments, the electronic device may perform linear weighted fusion on correlation filter loss functions of the plurality of picture frames according to the correlation filter algorithm and the mean pooling constraint condition and by using the expected output response of the tracked target region, the $n^{th}$ regional input feature map, and the input feature maps of the tracked target regions of the plurality of picture frames before the $n^{th}$ picture frame, to obtain a multi-frame based correlation filter model.

That is, the multi-frame based correlation filter model is obtained as follows:

$$\left(\sum_{t=1}^{T}\mu_t\hat{A}^t + F\overline{V}^T\overline{V}F^{-1} + \lambda\hat{G}^H\hat{G}\right)\hat{\omega} = \sum_{t=1}^{T}\mu_t(\hat{E}^t)^H y - FV^T\xi,$$

where $\mu_t$ is a weight of each sample t, that is, a weight of a $t^{th}$ picture frame.

If a quantity of picture frames before the $n^{th}$ picture frame is less than or equal to 50, the weighted filter of the $n^{th}$ picture frame may be calculated by using input feature maps of all the picture frames before the $n^{th}$ picture frame. If a quantity of picture frames before the $n^{th}$ picture frame is greater than 50, the picture frames before the $n^{th}$ picture frame may be fused, to generate 50 fused picture frames, and the $n^{th}$ weighted filter corresponding to the $n^{th}$ picture frame is calculated by using input feature maps of the 50 fused picture frames.

A picture frame closer to the $n^{th}$ picture frame corresponds to a larger weight.

In step S104, the electronic device performs feature extraction on an $(n+1)^{th}$ picture frame in the plurality of consecutive picture frames, to obtain an $(n+1)^{th}$ picture frame input feature map, where n+1=2. The $(n+1)^{th}$ picture frame input feature map is an input feature map of the $(n+1)^{th}$ picture frame.

Subsequently, the electronic device calculates a $2^{nd}$ output response by using the $1^{st}$ weighted filter obtained in step S103. The $2^{nd}$ output response is an output response corresponding to an input feature map of a $2^{nd}$ picture frame. The electronic device further compares the $2^{nd}$ output response with the output response in step S102, and determines a picture frame region corresponding to an output response that is closest to the output response (the maximum output response) in step S102 as a $2^{nd}$ tracked target region. The $2^{nd}$ tracked target region is a tracked target region of the $2^{nd}$ picture frame.

In step S105, a counting operation is performed on the feature extraction operation. Step S102 is performed again and a quantity of times of execution of the feature extraction operation is increased by 1. In this case, the counting operation is performed on the feature extraction operation, and it can be obtained that the quantity of times of execution of the feature extraction operation is 2. A $2^{nd}$ weighted filter corresponding to a $2^{nd}$ regional input feature map is calculated, until tracked target regions of all the consecutive picture frames in the target video are obtained in step S104. The $2^{nd}$ regional input feature map is an input feature map of the tracked target region of the $2^{nd}$ picture frame, and the $2^{nd}$ weighted filter is a weighted filter corresponding to the input feature map of the tracked target region of the $2^{nd}$ picture frame.

Therefore, the electronic device may perform an effectively tracking operation on the designated object or the specific object in the target video according to the tracked target regions of all the consecutive picture frames.

In this way, the process of tracking the designated object or the specific object in the target video in the target tracking method in this embodiment is completed.

Figure 4:
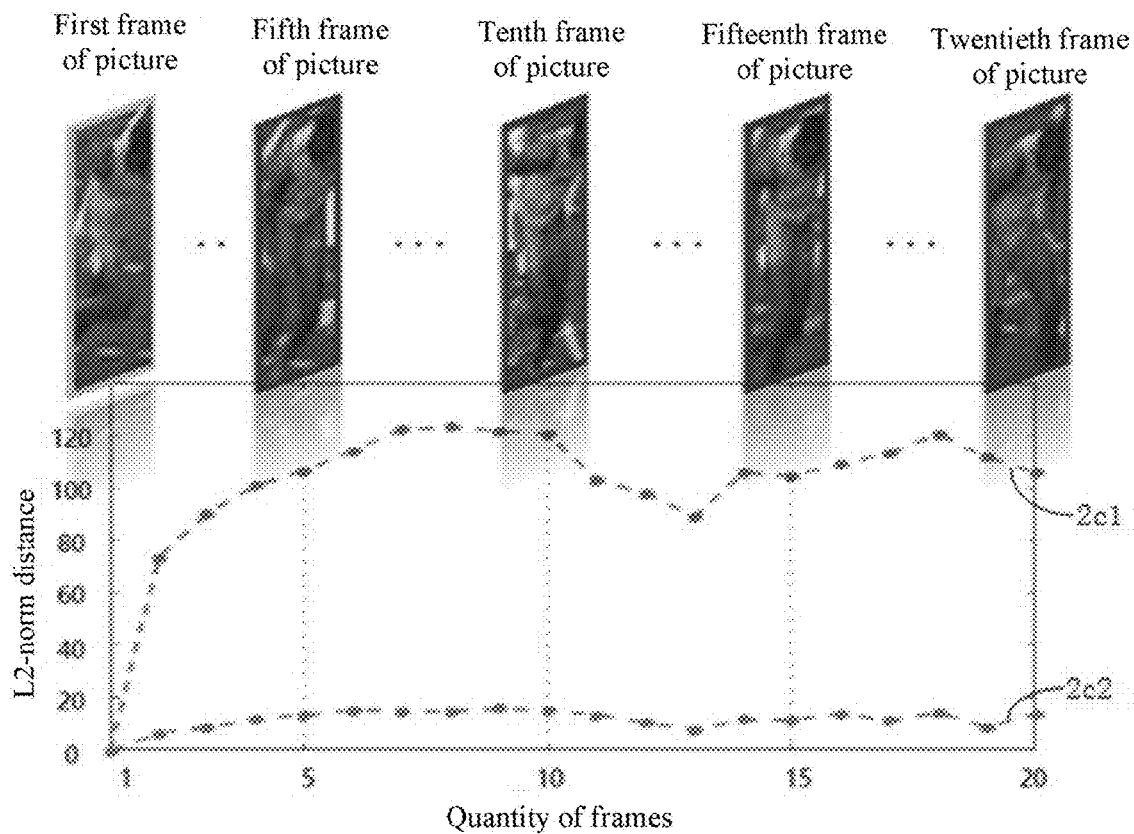
FIG. 4 is a schematic diagram of a feature change of picture frames of an embodiment of a target tracking method according to this application.

FIG. 4 is a schematic diagram of a feature change of picture frames of the foregoing embodiment of the target tracking method according to this application. A curve 2c1 is a change curve of an L2-norm distance of feature differences between the same regions in the first fame and other frames of the target tracking method in the related art, and a curve 2c2 is a change curve of an L2-norm distance of feature differences between the same regions in the first fame and other frames of the target tracking method in this embodiment. It may be seen from FIG. 4 that a change amplitude of the L2-norm distance in the target tracking method in this embodiment is relatively small, that is, a feature difference of the same feature region in different picture frames is relatively small. In this way, an effective tracking operation may be better performed on the designated object or the specific object in the target video.

In the target tracking method in this embodiment, a mean pooling operation is performed on filter weights corresponding to different feature channels of an input feature map, to reduce a quantity of algorithm parameters. In addition, a reduction operation does not need to be performed on a tracked target region, thereby ensuring a quantity of training sample features of the input feature map, avoiding occurrence of parameter over-fitting, and improving the precision and the effectiveness of target tracking.

Figure 5:
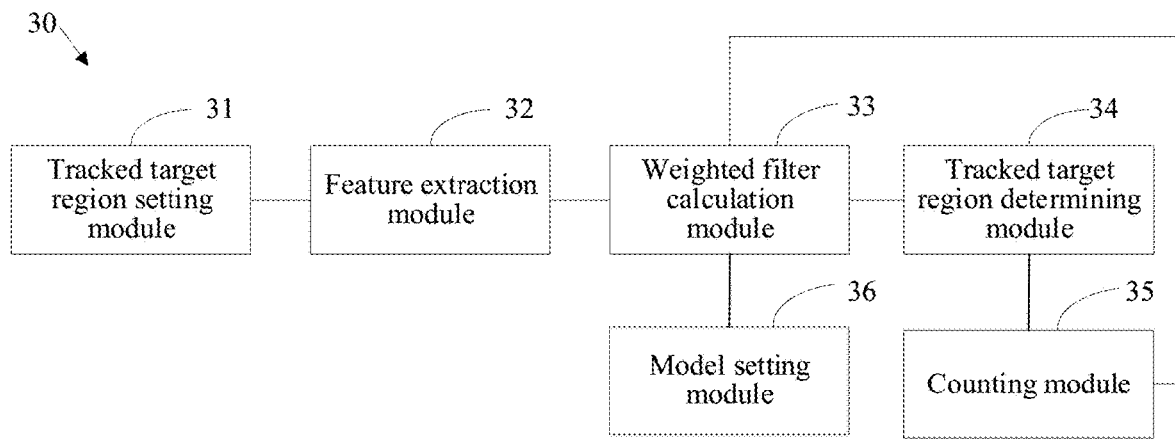
FIG. 5 is a schematic structural diagram of an embodiment of a target tracking apparatus according to this application.

This application further provides a target tracking apparatus. FIG. 5 is a schematic structural diagram of an embodiment of a target tracking apparatus according to this application. The target tracking apparatus in this embodiment may be implemented by using the embodiment of the target tracking method. A target tracking apparatus 30 in this embodiment includes a tracked target region setting module 31, a feature extraction module 32, a weighted filter calculation module 33, a tracked target region determining module 34, a counting module 35, and a model setting module 36.

The tracked target region setting module 31 is configured to obtain a plurality of consecutive picture frames of a target video, and set a tracked target region of an $n^{th}$ picture frame in the plurality of consecutive picture frames, n being a positive integer. The feature extraction module 32 is configured to perform a feature extraction operation on the tracked target region of the $n^{th}$ picture frame, to obtain an input feature map of the tracked target region. The weighted filter calculation module 33 is configured to calculate a weighted filter corresponding to the input feature map of the tracked target region of the $n^{th}$ picture frame according to a correlation filter algorithm and a mean pooling constraint condition. The tracked target region determining module 34 is configured to calculate an output response of an $(n+1)^{th}$ picture frame by using the weighted filter and an input feature map of the $(n+1)^{th}$ picture frame in the plurality of consecutive picture frames, and determine a tracked target region of the $(n+1)^{th}$ picture frame according to the output response of the $(n+1)^{th}$ picture frame. The counting module 35 is configured to perform a counting operation on the feature extraction operation. The model setting module 36 is configured to set ranges of pooling regions of the tracked target region.

Based on the same reasons as the method embodiment, the tracked target region of the $n^{th}$ picture frame in the plurality of consecutive picture frames may be used as an $n^{th}$ tracked target region, the input feature map of the tracked target region of the $n^{th}$ picture frame may be used as an $n^{th}$ regional input feature map, and the weighted filter corresponding to the input feature map of the tracked target region of the $n^{th}$ picture frame may be used as an $n^{th}$ weighted filter. The input feature map of the $(n+1)^{th}$ picture frame in the plurality of consecutive picture frames may be used as an $(n+1)^{th}$ picture frame input feature map, and the output response of the $(n+1)^{th}$ picture frame may be used as an $(n+1)^{th}$ output response. The tracked target region of the $(n+1)^{th}$ picture frame may be used as an $(n+1)^{th}$ tracked target region.

Figure 6:
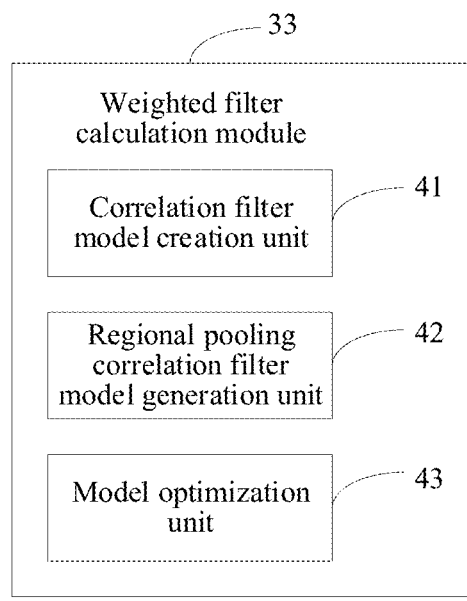
FIG. 6 is a schematic structural diagram of a weighted filter calculation module of an embodiment of a target tracking apparatus according to this application.

FIG. 6 is a schematic structural diagram of a weighted filter calculation module of an embodiment of a target tracking apparatus according to this application. The weighted filter calculation module 33 includes a correlation filter model creation unit 41, a regional pooling correlation filter model generation unit 42, and a model optimization unit 43.

The correlation filter model creation unit 41 is configured to create a correlation filter model of the $n^{th}$ weighted filter corresponding to the $n^{th}$ regional input feature map based on a ridge regression discriminant function, a constraint condition of the correlation filter model being set to: filter weights corresponding to feature channels in pooling regions are equal. The regional pooling correlation filter model generation unit 42 is configured to convert the correlation filter model having the constraint condition by using an augmented Lagrange multiplier method, to generate a regional pooling correlation filter model. The model optimization unit 43 is configured to optimize the regional pooling correlation filter model by using a conjugate gradient descent method, to obtain the $n^{th}$ weighted filter corresponding to the $n^{th}$ regional input feature map.

Figure 7:
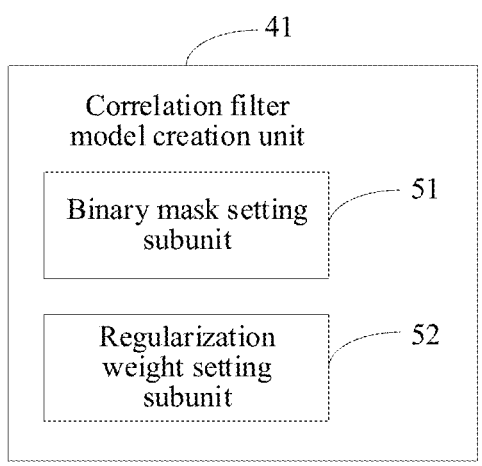
FIG. 7 is a schematic structural diagram of a correlation filter model creation unit of a weighted filter calculation module of an embodiment of a target tracking apparatus according to this application.

FIG. 7 is a schematic structural diagram of a correlation filter model creation unit of a weighted filter calculation module of an embodiment of a target tracking apparatus according to this application. The correlation filter model creation unit 41 includes a binary mask setting subunit 51 and a regularization weight setting subunit 52.

The binary mask setting subunit 51 is configured to set a binary mask for the $n^{th}$ weighted filter, to reduce a filter weight of a weighted filter corresponding to a region other than the $n^{th}$ tracked target region. The regularization weight setting subunit 52 is configured to set a regularization weight for the $n^{th}$ weighted filter, to increase a filter weight of the $n^{th}$ weighted filter in a central part of the $n^{th}$ tracked target region.

During use of the target tracking apparatus 30 in this embodiment, the tracked target region setting module 31 first obtains a plurality of consecutive picture frames of a target video. To facilitate in performing a tracking operation on a designated object or a specific object in the target video, a $1^{st}$ tracked target region corresponding to a $1^{st}$ picture frame in the plurality of consecutive picture frames is set herein. The $1^{st}$ tracked target region is a tracked target region of the $1^{st}$ picture frame in the plurality of consecutive picture frames.

The $1^{st}$ tracked target region herein is a picture region where the specific object or the designated object is located in the picture frame. The specific object or the designated object herein may be a preset character, an animal, a vehicle, or any moving object. In this way, corresponding tracked target regions may be found in other subsequent picture frames according to features of the tracked target region in the $1^{st}$ picture frame.

Subsequently, the feature extraction module 32 performs a feature extraction operation on an $n^{th}$ tracked target region, to obtain an $n^{th}$ regional input feature map corresponding to the $n^{th}$ tracked target region, where n=1. The $n^{th}$ tracked target region is a tracked target region of an $n^{th}$ picture frame, and the $n^{th}$ regional input feature map is an input feature map of the tracked target region of the $n^{th}$ picture frame in the plurality of consecutive picture frames.

In some embodiments, the feature extraction module 32 may divide the $n^{th}$ tracked target region into mesh regions with a size of a*a, and then perform a convolution sampling operation the mesh regions with a size of a*a by using d types of convolution kernels of different sizes, to obtain the $n^{th}$ regional input feature map having d feature channels. A size of the convolution kernel is less than a size of the mesh region.

The weighted filter calculation module 33 then calculates a $1^{st}$ weighted filter corresponding to a $1^{st}$ regional input feature map according to a correlation filter algorithm and a mean pooling constraint condition, the $1^{st}$ weighted filter including a filter weight corresponding to each feature channel in the input feature map. The $1^{st}$ weighted filter is a weighted filter corresponding to the input feature map of the tracked target region of the $1^{st}$ picture frame.

The foregoing process may include the following operation:

creating, by the correlation filter model creation unit 41 of the weighted filter calculation module 33, a correlation filter model of the $1^{st}$ weighted filter corresponding to the $1^{st}$ regional input feature map based on a ridge regression discriminant function, a constraint condition of the correlation filter model being set to: filter weights corresponding to feature channels in pooling regions are equal.

In some embodiments, the correlation filter model that is of the $1^{st}$ weighted filter corresponding to the $1^{st}$ regional input feature map and created by the correlation filter model creation unit 41 based on the ridge regression discriminant function is:

$$E(\omega) = \frac{1}{2}\left\| y - \sum_{d=1}^{D}(p_d \odot \omega_d) * x_d \right\|_2^2 + \frac{\lambda}{2}\sum_{d=1}^{D}\|g_d \odot \omega_d\|_2^2$$

where y is an expected output response of the tracked target region, $x_d$ is an input feature map of a feature channel d of the tracked target region, $\omega_d$ is a filter weight corresponding to the input feature map of the feature channel d of the tracked target region, D is a quantity of the feature channels, $p_d$ is a binary mask corresponding to the input feature map of the feature channel d of the tracked target region set by the binary mask setting subunit 51 of the correlation filter model creation unit 41, and $g_d$ is a regularization weight corresponding to the input feature map of the feature channel d of the tracked target region set by the regularization weight setting subunit 52 of the correlation filter model creation unit 41.

Output responses are target responses of convolution features extracted by deep networks of a tracked target region and a background region in a picture frame under the action of corresponding weighted filters. The expected output response is a preset output response that can distinguish the tracked target region from the background region of the picture frame. The expected output response is supposed to meet Gaussian distribution, that is, a feature of a region closer to the tracked target region corresponds to a larger target response.

The binary mask may effectively reduce a filter weight of a weighted filter corresponding to a region other than the tracked target region, thereby subsequently reducing an influence of a background region on determination of the tracked target region. That is, if a region corresponding to the input feature map is determined as a background region other than the tracked target region, a filter weight of a weighted filter related to the region is reduced by using the binary mask. The user may select whether to use the binary mask according to requirements thereof.

The regularization weight may effectively improve a filter weight of the weighted filter corresponding to the tracked target region in a central part of the tracked target region. That is, a filter weight of the central part of the tracked target region is directly increased. A picture feature in the central part of the tracked target region is of the greatest importance. Therefore, if the filter weight of the central part of the tracked target region is increased, recognition accuracy of the tracked target region may be further improved. The user may select whether to use the regularization weight according to requirements thereof.

Subsequently, the correlation filter model creation unit 41 sets that filter weights corresponding to feature channels in pooling regions are equal as a constraint condition of the correlation filter model.

$$\omega_d(i_n) = \omega_d(j_n), (i_n, j_n) \in P, \eta=1, \ldots, K,$$

where P is a corresponding pooling region, K is a quantity of features of an input feature map in the pooling region, and i and j are locations corresponding to input feature maps in the pooling region.

Ranges of the pooling regions herein are set by the model setting module 36 in the tracked target region (for example, set to a pixel size of 2*2 or 3*3). Adjacent pooling regions may share an edge, but ranges of adjacent pooling regions are non-overlapped. In this way, the pooling regions may be quickly set, and a quantity of algorithm parameters in the correlation filter model may be effectively reduced, thereby avoiding occurrence of parameter over-fitting, and improving the precision of target tracking.

The regional pooling correlation filter model generation unit 42 of the weighted filter calculation module 33 converts the obtained correlation filter model having the constraint condition by using an augmented Lagrange multiplier method, to generate a regional pooling correlation filter model.

The regional pooling correlation filter model generation unit 42 first performs Fourier transform on the correlation filter model and the corresponding constraint condition based on Parseval's theorem. The transformed correlation filter model is as follows:

$$E(\hat{\omega}) = \frac{1}{2}\left\| \hat{y} - \sum_{d}\hat{P}_d\hat{\omega}_d \odot \hat{x}_d \right\|_2^2 + \frac{\lambda}{2}\sum_{d=1}^{D}\|\hat{G}_d\omega_d\|_2^2; \text{ and}$$

$$V_d^1 F_d^{-1}\hat{\omega}_d = V_d^2 F_d^{-1}\hat{\omega}_d,$$

where $F_d$ is a Fourier transform matrix, $F_d^{-1}$ is an inverse Fourier transform matrix, $\hat{y}$ is a Fourier coefficient of an output response of the tracked target region, $\hat{P}_d$ is a Toeplitz matrix constructed by a Fourier coefficient of the binary mask corresponding to the input feature map of the feature channel d of the tracked target region, $\hat{\omega}_d$ is a Fourier coefficient of the filter weight corresponding to the input feature map of the feature channel d of the tracked target region, $\hat{x}_d$ is a Fourier coefficient of the input feature map of the feature channel d of the tracked target region, and $\hat{G}_d$ is a Toeplitz matrix constructed by a Fourier coefficient of the regularization weight corresponding to the input feature map of the feature channel d of the tracked target region.

$V_d^1$ and $V_d^2$ are index matrices using 1 or 0 as an entry, where $$V_d^1 F_d^{-1} \hat{\omega}_d = [\omega_d(i_1), \ldots, \omega_d(i_K)]^T; \text{ and}$$

$$V_d^2 F_d^{-1} \hat{\omega}_d = [\omega_d(j_1), \ldots, \omega_d(j_K)]^T.$$

Therefore, the transformed correlation filter model may be simplified as:

$$E(\hat{\omega}) = \frac{1}{2} \left\| \hat{y} - \sum_{d=1}^{D} \hat{E}_d \hat{\omega}_d \right\|_2^2 + \frac{\lambda}{2} \sum_{d=1}^{D} \|\hat{G}_d \hat{\omega}_d\|_2^2; \text{ and}$$

$$V_d F_d^{-1} \hat{\omega}_d = 0,$$

where $\hat{E}_d = \hat{X}_d \hat{P}_d$, $\hat{X}_d = \text{diag}(\hat{x}_d(1), \ldots, \hat{x}_d(N))$ is a diagonal matrix, and $V_d = V_d^1 - V_d^2$.

Subsequently, the regional pooling correlation filter model generation unit 42 converts the simplified correlation filter model and the constraint condition by using an augmented Lagrange multiplier method, to generate a regional pooling correlation filter model. The regional pooling correlation filter model is as follows:

$$\Gamma(\hat{\omega}, \xi) = \frac{1}{2} \left\| \hat{y} - \sum_{d=1}^{D} \hat{E}_d \hat{\omega}_d \right\|_2^2 +$$

$$\frac{\lambda}{2} \sum_{d=1}^{D} \|\hat{G}_d \hat{\omega}_d\|_2^2 + \sum_{d=1}^{D} \xi_d^T V_d F_d^{-1} \hat{\omega}_d + \frac{1}{2} \sum_{d=1}^{D} \Upsilon_d \|V_d F_d^{-1} \hat{\omega}_d\|_2^2,$$

where $\xi_d$ is a Lagrange multiplier of the feature channel d of the tracked target region. $\xi = [\xi_1^T, \ldots, \xi_D^T]^T$, and $\Upsilon_d$ is a penalty parameter.

The model optimization unit 43 of the weighted filter calculation module 33 optimizes the regional pooling correlation filter model by using a conjugate gradient descent method, to obtain the $1^{st}$ weighted filter corresponding to the $1^{st}$ regional input feature map.

An alternating direction method of multipliers is used herein to alternately obtain an optimized Lagrange multiplier and filter weight in the regional pooling correlation filter model. When the Lagrange multiplier is fixed, the corresponding filter weight may be calculated by using the conjugate gradient descent method, that is, a gradient of a target function related to the filter weight in the regional pooling correlation filter model is calculated. When the gradient is set as a null vector, a set of linear equations is obtained:

$$(\hat{A} + F\overline{V}^T\overline{V}F^{-1} + \lambda \hat{G}^H \hat{G})\hat{\omega} = \hat{E}^H \hat{y} - FV^T \xi,$$

where $E = [E_1, E_2, \ldots, E_D]$, and $\hat{A} = E^H E$.

When the filter weight $\hat{\omega}_d$ is calculated, $\xi_d$ may be optimized by using the following formula:

$$\xi_d^{i+1} = \xi_d^i + \Upsilon_d V_d F_d^{-1} \hat{\omega}_d,$$

where $\xi_d^i$ is used for representing the Lagrange multiplier $\xi_d$ in an $i^{th}$ iterative operation.

In addition, the penalty parameter $\Upsilon_d$ is optimized:

$$\Upsilon_d^{i+1} = \min(\Upsilon_{max}, \alpha \Upsilon_d^i),$$

where i represents a quantity of iterations.

By using the foregoing iteratively optimization operation, the weighted filter corresponding to the input feature map of the tracked target region may be finally obtained, that is, $\hat{\omega} = [\hat{\omega}_1, \hat{\omega}_2, \ldots, \hat{\omega}_D]$.

In this way, the process of calculating the $1^{st}$ weighted filter according to the $1^{st}$ regional input feature map and the expected output response of the tracked target region is completed.

In some embodiments, when the $1^{st}$ regional input feature map and the expected output response are set (a specific object in the picture frame is set as a center of the tracked target region), the weighted filter calculation module 33 directly calculates the $1^{st}$ weighted filter according to the correlation filter algorithm and the mean pooling constraint condition and by using the $1^{st}$ regional input feature map and the expected output response.

In this embodiment, the process of calculating the $1^{st}$ weighted filter according to the $1^{st}$ regional input feature map and the expected output response of the tracked target region is described in detail by using an example in which n=1. Subsequently, a plurality of picture frames after the $1^{st}$ picture frame are continuously processed according to the $1^{st}$ weighted filter corresponding to the $1^{st}$ picture frame. Therefore, n is not equal to 1 anymore, but is gradually increased by 1 each time, such as n=2, 3, 4, and so on. That is, n may be greater than or equal to 2.

Therefore, when an $n^{th}$ picture frame input feature map and an $(n-1)^{th}$ weighted filter are subsequently obtained and n is greater than or equal to 2, the weighted filter calculation module 33 may calculate an $n^{th}$ output response according to the correlation filter algorithm and the mean pooling constraint condition and by using the $n^{th}$ picture frame input feature map and the $(n-1)^{th}$ weighted filter. The $n^{th}$ picture frame input feature map is an input feature map of an $n^{th}$ picture frame, the $(n-1)^{th}$ weighted filter is a weighted filter corresponding to an input feature map of a tracked target region of an $(n-1)^{th}$ picture frame, and the $n^{th}$ output response is an output response of the $n^{th}$ picture frame.

Subsequently, the weighted filter calculation module 33 obtains a location of an $n^{th}$ tracked target region, and an $n^{th}$ regional input feature map according to the $n^{th}$ output response. That is, the weighted filter calculation module 33 uses a point having a maximum output response as a center of the tracked target region of the $n^{th}$ picture frame, to determine the $n^{th}$ regional input feature map. The $n^{th}$ tracked target region is a tracked target region of the $n^{th}$ picture frame, and the $n^{th}$ regional input feature map is an input feature map of the tracked target region of the $n^{th}$ picture frame.

Then, the weighted filter calculation module 33 may calculate an $n^{th}$ weighted filter corresponding to the $n^{th}$ regional input feature map according to the correlation filter algorithm and the mean pooling constraint condition and by using an expected output response of the tracked target region, and the $n^{th}$ regional input feature map. The $n^{th}$ weighted filter is a weighted filter corresponding to the input feature map of the tracked target region of the $n^{th}$ picture frame. This step is similar to the foregoing process of calculating the $1^{st}$ weighted filter.

To further improve the accuracy of the calculated $n^{th}$ weighted filter, the weighted filter calculation module 33 may calculate the $n^{th}$ weighted filter according to the correlation filter algorithm and the mean pooling constraint condition and by using an expected output response of the tracked target region, the $n^{th}$ regional input feature map, and input feature maps of tracked target regions of a plurality of picture frames before the $n^{th}$ picture frame.

In some embodiments, the weighted filter calculation module 33 may perform linear weighted fusion on correlation filter loss functions of the plurality of picture frames according to the correlation filter algorithm and the mean pooling constraint condition and by using the expected output response of the tracked target region, the $n^{th}$ regional input feature map, and the input feature maps of the tracked target regions of the plurality of picture frames before the $n^{th}$ picture frame, to obtain a multi-frame based correlation filter model.

That is, the multi-frame based correlation filter model is obtained as follows:

$$\left(\sum_{t=1}^{T}\mu_t \hat{A}^t + F\bar{V}^T \bar{V} F^{-1} + \lambda \hat{G}^H \hat{G}\right)\hat{\omega} = \sum_{t=1}^{T}\mu_t (\hat{E}^t)^H y - FV^T \xi,$$

where $\mu_t$ is a weight of each sample t, that is, a weight of a $t^{th}$ picture frame.

If a quantity of picture frames before the $n^{th}$ picture frame is less than or equal to 50, the weighted filter of the $n^{th}$ picture frame may be calculated by using input feature maps of all the picture frames before the $n^{th}$ picture frame. If a quantity of picture frames before the $n^{th}$ picture frame is greater than 50, the picture frames before the $n^{th}$ picture frame may be fused, to generate 50 fused picture frames, and the $n^{th}$ weighted filter corresponding to the $n^{th}$ picture frame is calculated by using input feature maps of the 50 fused picture frames.

A picture frame closer to the $n^{th}$ picture frame corresponds to a larger weight.

Subsequently, the tracked target region determining module 34 performs feature extraction on an $(n+1)^{th}$ picture frame in the plurality of consecutive picture frames, to obtain an $(n+1)^{th}$ picture frame input feature map, where n+1=2. The $(n+1)^{th}$ picture frame input feature map is an input feature map of the $(n+1)^{th}$ picture frame.

Subsequently, the tracked target region determining module 34 calculates a $2^{nd}$ output response by using the obtained $1^{st}$ weighted filter. The $2^{nd}$ output response is an output response corresponding to an input feature map of a $2^{nd}$ picture frame. The tracked target region determining module compares the $2^{nd}$ output response with the output response of the feature extraction module, and determines a picture frame region corresponding to an output response that is closest to the output response (the maximum output response) of the feature extraction module as a $2^{nd}$ tracked target region. The $2^{nd}$ tracked target region is a tracked target region of the $2^{nd}$ picture frame.

Finally, the counting module 35 performs a counting operation on the feature extraction operation. Step S102 is performed again and a quantity of times of execution of the feature extraction operation is increased by 1. In this case, the counting operation is performed on the feature extraction operation, and it can be obtained that the quantity of times of execution of the feature extraction operation is 2. The weighted filter calculation module 33 calculates a $2^{nd}$ weighted filter corresponding to a $2^{nd}$ regional input feature map, until tracked target regions of all the consecutive picture frames in the target video are obtained by the tracked target region determining module 34. The $2^{nd}$ regional input feature map is an input feature map of the tracked target region of the $2^{nd}$ picture frame, and the $2^{nd}$ weighted filter is a weighted filter corresponding to the input feature map of the tracked target region of the $2^{nd}$ picture frame.

Therefore, the target tracking apparatus 30 may perform an effectively tracking operation on the designated object or the specific object in the target video according to the tracked target regions of all the consecutive picture frames.

In this way, the process of tracking the designated object or the specific object in the target video of the target tracking apparatus 30 in this embodiment is completed. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In the target tracking apparatus in this embodiment, a mean pooling operation is performed on filter weights corresponding to different feature channels of an input feature map, to reduce a quantity of algorithm parameters. In addition, a reduction operation does not need to be performed on a tracked target region, thereby ensuring a quantity of training sample features of the input feature map, avoiding occurrence of parameter over-fitting, and improving the precision and the effectiveness of target tracking.

Figure 8:
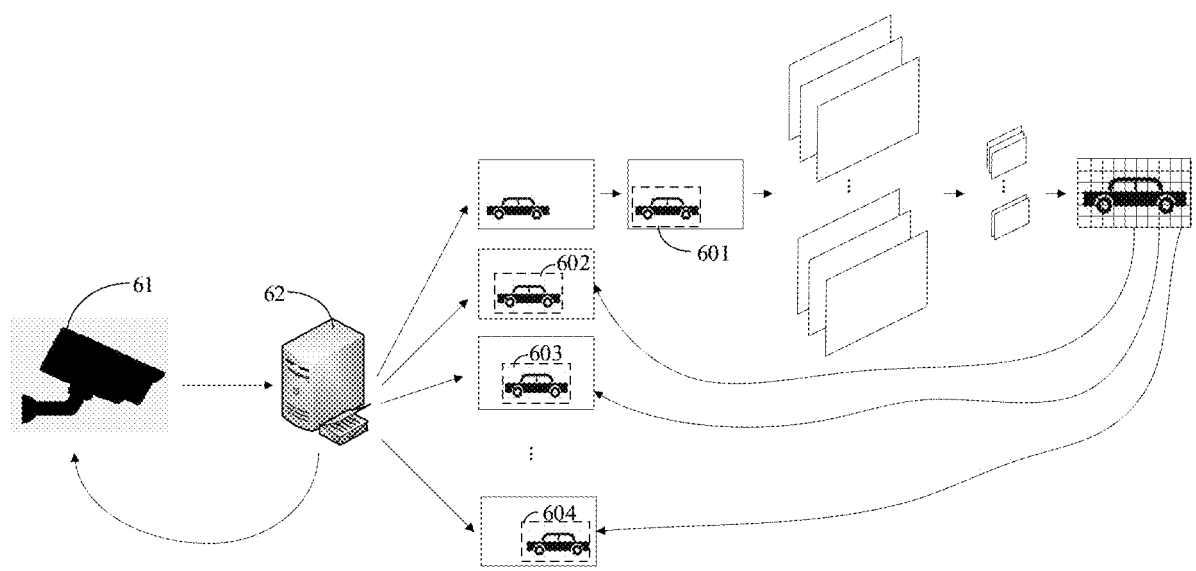
FIG. 8 is a schematic diagram of target tracking of a target tracking method and a target tracking apparatus according to this application.
Figure 9:
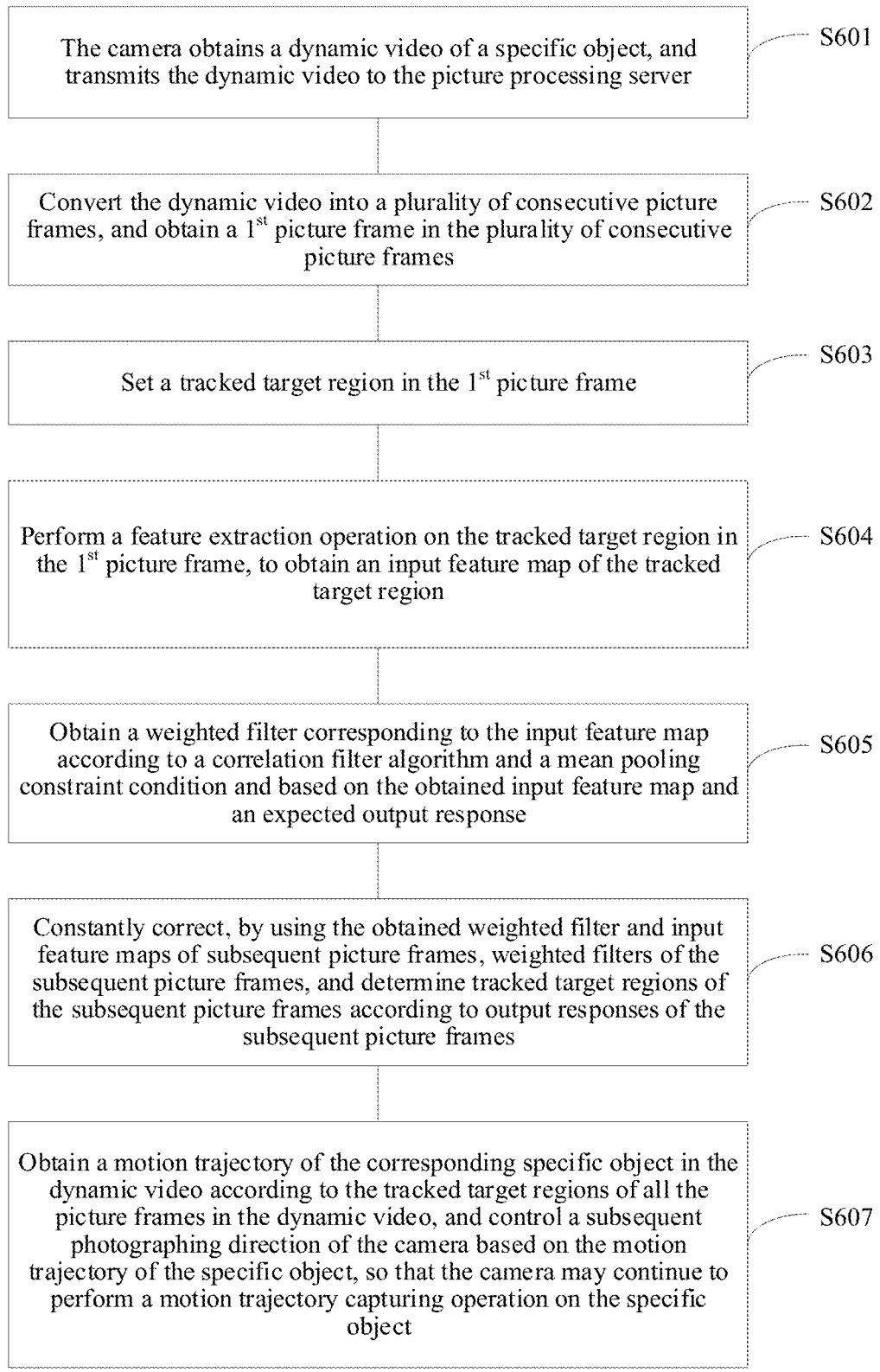
FIG. 9 is a flowchart of target tracking of a target tracking method and a target tracking apparatus according to this application.

Detailed working principles of the target tracking method and the target tracking apparatus in this application are described below by using an optional embodiment. FIG. 8 is a schematic diagram of target tracking of a target tracking method and a target tracking apparatus according to this application, and FIG. 9 is a flowchart of target tracking of a target tracking method and a target tracking apparatus according to this application.

In this embodiment, a camera 61 obtains a dynamic video of a specific object, and subsequently, a picture processing server 62 performs a target tracking operation on the specific object in the dynamic video, to obtain a motion trajectory of the specific object in the dynamic video. A procedure of target tracking in this embodiment includes the following steps:

Step S601. The camera 61 obtains a dynamic video of a specific object, and transmits the dynamic video to the picture processing server 62.

Step S602. The picture processing server 62 converts the dynamic video into a plurality of consecutive picture frames, and obtains a $1^{st}$ picture frame in the plurality of consecutive picture frames.

Step S603. Set a $1^{st}$ tracked target region, that is, an automobile region 601 in FIG. 8, corresponding to the $1^{st}$ picture frame. The $1^{st}$ tracked target region is a tracked target region of the $1^{st}$ picture frame.

Step S604. The picture processing server 62 performs a feature extraction operation on the $1^{st}$ tracked target region, that is, performs a convolution feature extraction operation on the tracked target region by using a convolution kernel of a predetermined size, to obtain a $1^{st}$ regional input feature map corresponding to the $1^{st}$ tracked target region. The $1^{st}$ regional input feature map is an input feature map of the tracked target region of the 1st picture frame.

Step S605. The picture processing server 62 obtains a 1st weighted filter corresponding to the 1st regional input feature map according to a correlation filter algorithm and a mean pooling constraint condition and based on the 1st regional input feature map obtained in step S604 and an expected output response. The 1st weighted filter being a weighted filter corresponding to the input feature map of the tracked target region of the 1st picture frame.

Step S606. The picture processing server 62 sequentially calculates output responses of subsequent picture frames by using the 1st weighted filter obtained in step S605 and input feature maps of the subsequent picture frames, and constantly corrects input feature maps of tracked target regions of the subsequent picture frames based on the output responses.

Subsequently, weighted filters of the subsequent picture frames are constantly corrected by using the corrected input feature maps of the tracked target regions of the subsequent picture frames and expected output responses. In this way, the tracked target regions of the subsequent picture frames, that is, an automobile region 602, an automobile region 603, and an automobile region 604 shown in FIG. 8, may be determined according to the output responses of the subsequent picture frames.

Step S607. The picture processing server 62 obtains a motion trajectory of the corresponding specific object in the dynamic video according to the tracked target regions of all the picture frames in the dynamic video, and controls a subsequent photographing direction of the camera 61 based on the motion trajectory of the specific object, so that the camera 61 may continue to perform a motion trajectory capturing operation on the specific object.

In this way, the procedure of target tracking of the target tracking method and the target tracking apparatus in this embodiment is completed.

In the target tracking method and the target tracking apparatus in this embodiment, a mean pooling operation is performed on filter weights corresponding to different feature channels of an input feature map, to reduce a quantity of algorithm parameters. In addition, a reduction operation does not need to be performed on a tracked target region, which resolves a primary defect of a correlation filter algorithm, thereby ensuring a quantity of training sample features of the input feature map, avoiding occurrence of parameter over-fitting, and improving the robustness of the correlation filter algorithm. Therefore, the precision and the effectiveness of target tracking are improved, and the technical problem of parameter over-fitting or relatively low tracking precision in the target tracking method and the target tracking apparatus in the related art is effectively resolved.

Terms such as "component", "module", "system", "interface", and "process" used in this application are generally intended to refer to computer-related entities: hardware, combinations of hardware and software, software, or software being executed. For example, a component may be, but is not limited to, a process running on a processor, a processor, an object, an executable application, an executed thread, a program, and/or a computer. According to the drawings, both an application running on a controller and the controller may be components. One or more components may reside within a process and/or a thread of execution, and a component may be located on one computer and/or distributed between two or more computers.

Figure 10:
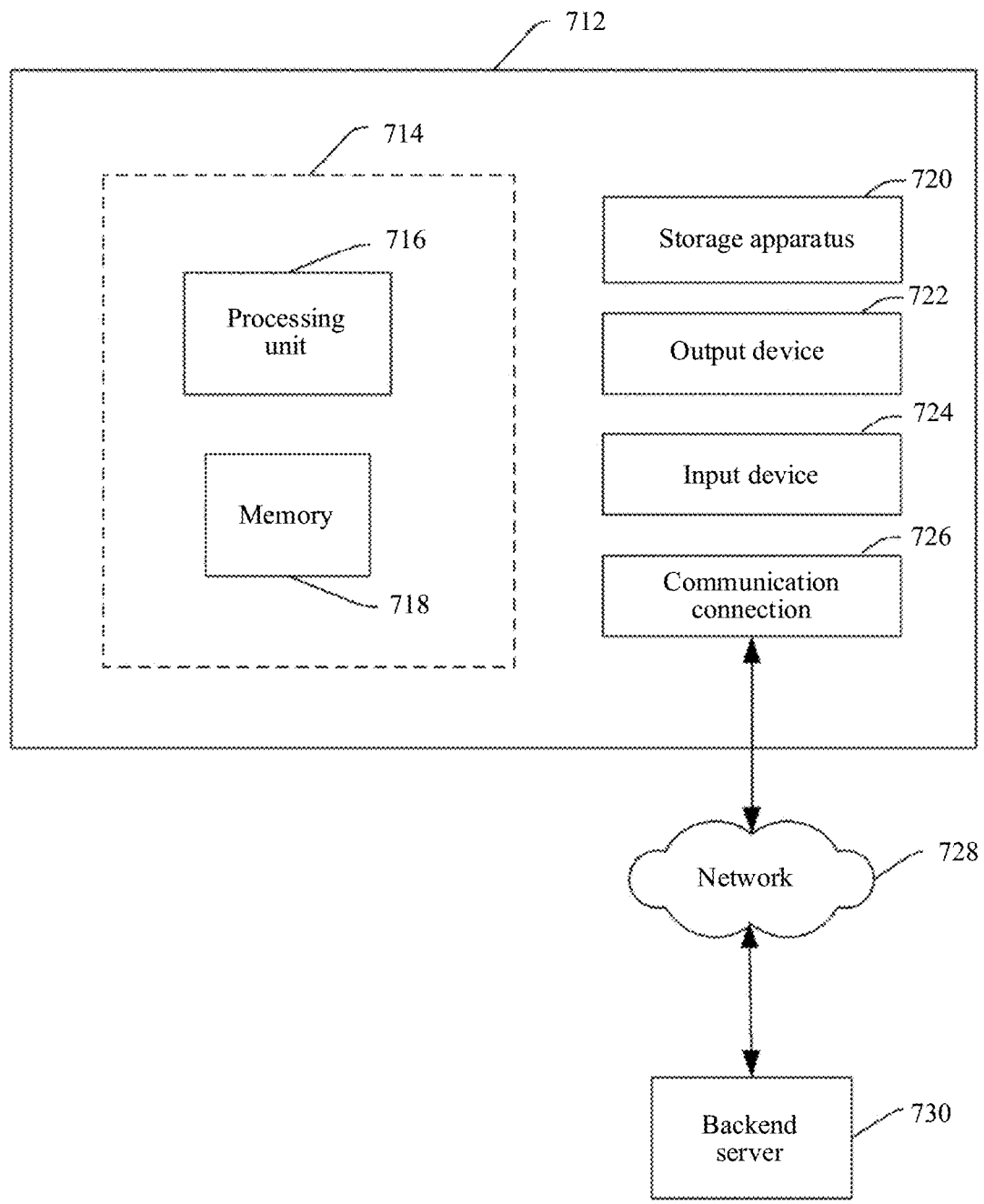
FIG. 10 is a schematic structural diagram of a working environment of an electronic device in which a target tracking apparatus is located according to this application.

FIG. 10 and subsequent discussion provide a brief and general description of a working environment of an electronic device in which the target tracking apparatus for implementing this application is located. The working environment in FIG. 10 is only an example of a proper working environment, and is not intended to suggest any limitation on a scope of a purpose or function of the working environment.

Although it is not specified, the embodiments are described in a general background that the "computer-readable instructions" are executed by one or more electronic devices. The computer-readable instructions may be distributed by using a computer-readable medium (discussed below). The computer-readable instruction may be implemented as a program module, for example, a function, an object, an application programming interface (API), or a data structure for executing a particular task or implementing a particular abstract data type. Typically, functions of the computer-readable instruction can be freely combined or distributed in various environments.

FIG. 10 shows an instance of an electronic device 712 that includes one or more embodiments of the target tracking apparatus of this application. In a configuration, the electronic device 712 includes at least one processing unit 716 and a memory 718. Based on an exact configuration and type of the electronic device, the memory 718 may be a volatile memory (for example, a RAM), a non-volatile memory (for example, a ROM or a flash memory), or a combination thereof. The configuration is shown in FIG. 10 by using a dashed line 714.

In another embodiment, the electronic device 712 may include an additional feature and/or function. For example, the device 712 may further include an additional storage apparatus (for example, a removable and/or non-removable storage apparatus), which includes, but is not limited to, a magnetic storage apparatus, an optical storage apparatus, and the like. This additional storage apparatus is shown as a storage apparatus 720 in FIG. 10. In an embodiment, a computer-readable instruction used for implementing one or more embodiments provided in the present disclosure may be stored in the storage apparatus 720. The storage apparatus 720 may store another computer-readable instruction used to implement an operating system, an application program, or the like. The computer-readable instruction may be loaded into the memory 718 to be executed by, for example, the processing unit 716.

The term "computer-readable storage medium" used herein includes a computer storage medium. The computer storage medium includes volatile or non-volatile media, or removable or non-removable media that are implemented by using any method or technology used to store information such as a computer-readable instruction or other data. The memory 718 and the storage apparatus 720 are instances of the computer storage medium. The computer storage medium includes, but is not limited to, a RAM, a ROM, an EEPROM, a flash memory or another memory technology, a CD-ROM, a digital versatile disk (DVD) or another optical storage apparatus, a cartridge tape, a magnetic tape, a magnetic disk storage apparatus or another magnetic storage device, or any other medium that can be used for storing expected information and can be accessed by the electronic device 712. Any such computer storage medium may be a part of the electronic device 712.

The electronic device 712 may further include a communication connection 726 allowing communication between the electronic device 712 and another device. The communication connection 726 may include, but is not limited to, a modem, a network interface card (NIC), an integrated network interface, a radio frequency transmitter/receiver, an infrared port, a USB connection, or another interface configured to connect the electronic device 712 to another electronic device. The communication connection 726 may include a wired connection or a wireless connection. The communication connection 726 may transmit and/or receive communication media.

The term "computer-readable storage medium" may include the communication medium. The communication medium typically includes computer-readable instructions or other data in a "modulated data signal" such as a carrier or another transmission mechanism, and includes any information transfer medium. The term "modulated data signal" may include such a signal: One or more features of the signal are set or changed by encoding information into the signal.

The electronic device 712 may include an input device 724, for example, a keyboard, a mouse, a stylus, a voice input device, a touch input device, an infrared camera, a video input device, and/or any other input device. The device 712 may also include an output device 722, such as one or more displays, a speaker, a printer and/or any other output device. The input device 724 and the output device 722 may be connected to the electronic device 712 by using a wired connection, a wireless connection, or any combination thereof. In an embodiment, an input device or an output device of another electronic device may be used as the input device 724 or the output device 722 of the electronic device 712.

Components of the electronic device 712 may be connected by using various interconnections (such as a bus). Such interconnection may include Peripheral Component Interconnect (PCI) (for example, PCI Express), Universal Serial Bus (USB), FireWire (IEEE 1394), an optical bus structure, and the like. In another embodiment, components of the electronic device 712 may be interconnected by using a network. For example, the memory 718 may include a plurality of physical memory units that are located at different physical locations and interconnected by using a network.

A person skilled in the art may be aware that a storage device configured to store computer-readable instructions may be distributed across networks. For example, a backend server 730 that may be accessed through a network 728 may be configured to store computer-readable instructions used for implementing one or more embodiments provided in this application. The electronic device 712 may access the backend server 730 and download a part or all of the computer-readable instructions for execution. Alternatively, the electronic device 712 may download a plurality of computer-readable instructions as required, or some instructions may be executed by the electronic device 712 and some instructions may be executed by the backend server 730.

An embodiment of this application provides an electronic device, including a processor and a memory, the memory storing a computer program, the processor invoking the computer program to perform the following operations:

obtaining a plurality of consecutive picture frames of a target video, and setting an $n^{th}$ tracked target region corresponding to an $n^{th}$ picture frame in the plurality of consecutive picture frames, n being a positive integer;

performing a feature extraction operation on the $n^{th}$ tracked target region, to obtain an $n^{th}$ regional input feature map corresponding to the $n^{th}$ tracked target region, the $n^{th}$ regional input feature map including a plurality of feature channels;

calculating an $n^{th}$ weighted filter corresponding to the $n^{th}$ regional input feature map according to a correlation filter algorithm and a mean pooling constraint condition, the $n^{th}$ weighted filter including a filter weight corresponding to each feature channel in the $n^{th}$ regional input feature map;

calculating an $(n+1)^{th}$ output response by using the $n^{th}$ weighted filter and an $(n+1)^{th}$ picture frame input feature map, and determining an $(n+1)^{th}$ tracked target region corresponding to an $(n+1)^{th}$ picture frame according to the $(n+1)^{th}$ output response, the $(n+1)^{th}$ picture frame input feature map being an input feature map of the $(n+1)^{th}$ picture frame in the plurality of consecutive picture frames; and performing feature extraction on the $(n+1)^{th}$ tracked target region, to obtain an $(n+1)^{th}$ regional input feature map corresponding to the $(n+1)^{th}$ tracked target region, and calculating an $(n+1)^{th}$ weighted filter corresponding to the $(n+1)^{th}$ regional input feature map, until tracked target regions of all the consecutive picture frames are obtained.

In some embodiments, the processor invokes the computer program, and is configured to perform the following operations:

creating a correlation filter model of the $n^{th}$ weighted filter corresponding to the $n^{th}$ regional input feature map based on a ridge regression discriminant function, a constraint condition of the correlation filter model being set to: filter weights corresponding to feature channels in pooling regions are equal;

converting the correlation filter model having the constraint condition by using an augmented Lagrange multiplier method, to generate a regional pooling correlation filter model; and optimizing the regional pooling correlation filter model by using a conjugate gradient descent method, to obtain the $n^{th}$ weighted filter corresponding to the $n^{th}$ regional input feature map.

In some embodiments, the processor invokes the computer program, and is configured to perform the following operation:

setting ranges of a plurality of pooling regions of the tracked target region, ranges of adjacent pooling regions being non-overlapped.

In some embodiments, the processor invokes the computer program, and is configured to perform the following operations:

calculating, when a $1^{st}$ regional input feature map is obtained, a $1^{st}$ weighted filter corresponding to the $1^{st}$ regional input feature map according to the correlation filter algorithm and the mean pooling constraint condition and by using the $1^{st}$ regional input feature map and an expected output response of a tracked target region, the $1^{st}$ regional input feature map being an input feature map of a $1^{st}$ tracked target region corresponding to a $1^{st}$ picture frame;

calculating, when an $n^{th}$ picture frame input feature map and an $(n-1)^{th}$ weighted filter are obtained and n is greater than or equal to 2, an $n^{th}$ output response according to the correlation filter algorithm and the mean pooling constraint condition and by using the $n^{th}$ picture frame input feature map and the $(n-1)^{th}$ weighted filter, the $n^{th}$ picture frame input feature map being an input feature map of the $n^{th}$ picture frame, and the $(n-1)^{th}$ weighted filter being a weighted filter corresponding to an $(n-1)^{th}$ picture frame;

obtaining a location of the tracked target region of the $n^{th}$ picture frame, and the $n^{th}$ regional input feature map according to the $n^{th}$ output response; and calculating the $n^{th}$ weighted filter according to the correlation filter algorithm and the mean pooling constraint condition and by using an expected output response of the tracked target region, and the $n^{th}$ regional input feature map.

In some embodiments, the processor invokes the computer program, and is configured to perform the following operations:

calculating, when an $n^{th}$ picture frame input feature map and an $(n-1)^{th}$ weighted filter are obtained and n is greater than or equal to 2, an $n^{th}$ output response according to the correlation filter algorithm and the mean pooling constraint condition and by using the $n^{th}$ picture frame input feature map and the $(n-1)^{th}$ weighted filter, the $n^{th}$ picture frame input feature map being an input feature map of the $n^{th}$ picture frame, and the $(n-1)^{th}$ weighted filter being a weighted filter corresponding to an $(n-1)^{th}$ picture frame;

obtaining a location of the tracked target region of the $n^{th}$ picture frame, and the $n^{th}$ regional input feature map according to the $n^{th}$ output response; and calculating the $n^{th}$ weighted filter according to the correlation filter algorithm and the mean pooling constraint condition and by using an expected output response of the tracked target region, the $n^{th}$ regional input feature map, and input feature maps of tracked target regions of a plurality of picture frames before the $n^{th}$ picture frame.

In some embodiments, the processor invokes the computer program, and is configured to perform the following operations:

performing linear weighted fusion on correlation filter loss functions of the plurality of picture frames according to the correlation filter algorithm and the mean pooling constraint condition and by using the expected output response of the tracked target region, the $n^{th}$ regional input feature map, and the input feature maps of the tracked target regions of the plurality of picture frames before the $n^{th}$ picture frame, to obtain a multi-frame based correlation filter model; and performing calculation on the multi-frame based correlation filter model, to obtain the $n^{th}$ weighted filter.

In some embodiments, the processor invokes the computer program, and is configured to perform the following operation:

setting a binary mask for the $n^{th}$ weighted filter, to reduce a filter weight of a weighted filter corresponding to a region other than the $n^{th}$ tracked target region.

In some embodiments, the processor invokes the computer program, and is configured to perform the following operation:

setting a regularization weight for the $n^{th}$ weighted filter, to increase a filter weight of the $n^{th}$ weighted filter in a central part of the $n^{th}$ tracked target region.

This specification provides various operations of the embodiments. In an embodiment, the one or more operations may constitute one or more computer-readable instructions stored on a computer-readable medium, and the computer-readable instructions enable a computing device to perform the operations when the computer-readable instructions are executed by an electronic device. A sequence in which some or all operations are described is not to be construed as an implication that these operations need to be sequence-related. A person skilled in the art will understand an alternative sequence having the benefits of this specification. Moreover, it is to be understood that not all operations necessarily exist in each embodiment provided in the present disclosure.

In addition, although the present disclosure has been shown and described relative to one or more implementations, a person skilled in the art may think of equivalent variations and modifications based on reading and understanding of this specification and the accompanying drawings. This disclosure includes all the modifications and variations, and is limited only by the scope of the claims. Especially, for various functions performed by the foregoing component (such as an element or a resource), the term used for describing the component is intended to indicate any component (unless otherwise specified) that performs a specified function of the component (for example, they are functionally equivalent), even if the structure of the component is not the same as a disclosed structure of the present disclosure that performs the function in the exemplary implementations herein. In addition, although a particular feature of the present disclosure is disclosed relative to only one of the several implementations, this feature may be combined with one or more other features of another implementation that is expected and beneficial for a given or particular application. In addition, if terms "include", "have", "contain", or a variation thereof is used in a specific implementation or the claims, the terms are intended to indicate "include" in a manner similar to a manner of the term "comprise".

Functional units according to the embodiments of this application may be integrated in one processing module or exist as separate physical units, or two or more units are integrated into one module. The integrated module may be implemented in the form of hardware, or may be implemented in a form of a software functional module. If implemented in the form of software functional modules and sold or used as an independent product, the integrated module may also be stored in a computer-readable storage medium. The storage medium mentioned above may be a read-only memory, a magnetic disk, an optical disc, or the like. The foregoing apparatuses or systems may perform a method in a corresponding method embodiment.

An embodiment of this application provides a storage medium, storing processor-executable instructions, the instructions being loaded by one or more processors to perform the following operations:

obtaining a plurality of consecutive picture frames of a target video, and setting an $n^{th}$ tracked target region corresponding to an $n^{th}$ picture frame in the plurality of consecutive picture frames, n being a positive integer;

performing a feature extraction operation on the $n^{th}$ tracked target region, to obtain an $n^{th}$ regional input feature map corresponding to the $n^{th}$ tracked target region, the $n^{th}$ regional input feature map including a plurality of feature channels;

calculating an $n^{th}$ weighted filter corresponding to the $n^{th}$ regional input feature map according to a correlation filter algorithm and a mean pooling constraint condition, the $n^{th}$ weighted filter including a filter weight corresponding to each feature channel in the $n^{th}$ regional input feature map;

calculating an $(n+1)^{th}$ output response by using the $n^{th}$ weighted filter and an $(n+1)^{th}$ picture frame input feature map, and determining an $(n+1)^{th}$ tracked target region corresponding to an $(n+1)^{th}$ picture frame according to the $(n+1)^{th}$ output response, the $(n+1)^{th}$ picture frame input feature map being an input feature map of the $(n+1)^{th}$ picture frame in the plurality of consecutive picture frames; and performing feature extraction on the $(n+1)^{th}$ tracked target region, to obtain an $(n+1)^{th}$ regional input feature map corresponding to the $(n+1)^{th}$ tracked target region, and calculating an $(n+1)^{th}$ weighted filter corresponding to the $(n+1)^{th}$ regional input feature map, until tracked target regions of all the consecutive picture frames are obtained.

In some embodiments, the instructions are loaded by one or more processors to perform the following operations:

creating a correlation filter model of the $n^{th}$ weighted filter corresponding to the $n^{th}$ regional input feature map based on a ridge regression discriminant function, a constraint condition of the correlation filter model being set to: filter weights corresponding to feature channels in pooling regions are equal;

converting the correlation filter model having the constraint condition by using an augmented Lagrange multiplier method, to generate a regional pooling correlation filter model; and optimizing the regional pooling correlation filter model by using a conjugate gradient descent method, to obtain the $n^{th}$ weighted filter corresponding to the $n^{th}$ regional input feature map.

In some embodiments, the instructions are loaded by one or more processors to perform the following operation:

setting ranges of a plurality of pooling regions of the tracked target region, ranges of adjacent pooling regions being non-overlapped.

In some embodiments, the instructions are loaded by one or more processors to perform the following operations:

calculating, when a $1^{st}$ regional input feature map is obtained, a $1^{st}$ weighted filter corresponding to the $1^{st}$ regional input feature map according to the correlation filter algorithm and the mean pooling constraint condition and by using the $1^{st}$ regional input feature map and an expected output response of a tracked target region, the $1^{st}$ regional input feature map being an input feature map of a $1^{st}$ tracked target region corresponding to a $1^{st}$ picture frame;

calculating, when an $n^{th}$ picture frame input feature map and an $(n-1)^{th}$ weighted filter are obtained and n is greater than or equal to 2, an $n^{th}$ output response according to the correlation filter algorithm and the mean pooling constraint condition and by using the $n^{th}$ picture frame input feature map and the $(n-1)^{th}$ weighted filter, the $n^{th}$ picture frame input feature map being an input feature map of the $n^{th}$ picture frame, and the $(n-1)^{th}$ weighted filter being a weighted filter corresponding to an $(n-1)^{th}$ picture frame;

obtaining a location of the tracked target region of the $n^{th}$ picture frame, and the $n^{th}$ regional input feature map according to the $n^{th}$ output response; and calculating the $n^{th}$ weighted filter according to the correlation filter algorithm and the mean pooling constraint condition and by using an expected output response of the tracked target region, and the $n^{th}$ regional input feature map.

In some embodiments, the instructions are loaded by one or more processors to perform the following operations:

calculating, when an $n^{th}$ picture frame input feature map and an $(n-1)^{th}$ weighted filter are obtained and n is greater than or equal to 2, an $n^{th}$ output response according to the correlation filter algorithm and the mean pooling constraint condition and by using the $n^{th}$ picture frame input feature map and the $(n-1)^{th}$ weighted filter, the $n^{th}$ picture frame input feature map being an input feature map of the $n^{th}$ picture frame, and the $(n-1)^{th}$ weighted filter being a weighted filter corresponding to an $(n-1)^{th}$ picture frame;

obtaining a location of the tracked target region of the $n^{th}$ picture frame, and the $n^{th}$ regional input feature map according to the $n^{th}$ output response; and calculating the $n^{th}$ weighted filter according to the correlation filter algorithm and the mean pooling constraint condition and by using an expected output response of the tracked target region, the $n^{th}$ regional input feature map, and input feature maps of tracked target regions of a plurality of picture frames before the $n^{th}$ picture frame.

In some embodiments, the instructions are loaded by one or more processors to perform the following operations:

performing linear weighted fusion on correlation filter loss functions of the plurality of picture frames according to the correlation filter algorithm and the mean pooling constraint condition and by using the expected output response of the tracked target region, the $n^{th}$ regional input feature map, and the input feature maps of the tracked target regions of the plurality of picture frames before the $n^{th}$ picture frame, to obtain a multi-frame based correlation filter model; and performing calculation on the multi-frame based correlation filter model, to obtain the $n^{th}$ weighted filter.

In some embodiments, the instructions are loaded by one or more processors to perform the following operation:

setting a binary mask for the $n^{th}$ weighted filter, to reduce a filter weight of a weighted filter corresponding to a region other than the $n^{th}$ tracked target region.

In some embodiments, the instructions are loaded by one or more processors to perform the following operation:

setting a regularization weight for the $n^{th}$ weighted filter, to increase a filter weight of the $n^{th}$ weighted filter in a central part of the $n^{th}$ tracked target region.

In view of the above, although this application is disclosed in the above by using embodiments, the sequence numbers of the embodiments are merely used for ease of description, and do not limit the sequence of the embodiments of this application. Moreover, the foregoing embodiments are not intended to limit this application. A person of ordinary skill in the art may make various variations and modifications without departing from the spirit and scope of this application. Therefore, the protection scope of this application falls within the scope defined by the claims.

What is claimed is:

1. A target tracking method performed at an electronic device, the method comprising:

obtaining a plurality of consecutive picture frames of a target video, and setting an $n^{th}$ tracked target region corresponding to an $n^{th}$ picture frame in the plurality of consecutive picture frames, n being a positive integer;

performing a feature extraction operation on the $n^{th}$ tracked target region, to obtain an $n^{th}$ regional input feature map corresponding to the $n^{th}$ tracked target region, the $n^{th}$ regional input feature map comprising a plurality of feature channels;

calculating an $n^{th}$ weighted filter corresponding to the $n^{th}$ regional input feature map according to a correlation filter algorithm and a mean pooling constraint condition, the $n^{th}$ weighted filter comprising a filter weight corresponding to each feature channel in the $n^{th}$ regional input feature map;

calculating an $(n+1)^{th}$ output response by using the $n^{th}$ weighted filter and an $(n+1)^{th}$ picture frame input feature map, and determining an $(n+1)^{th}$ tracked target region corresponding to an $(n+1)^{th}$ picture frame according to the $(n+1)^{th}$ output response, the $(n+1)^{th}$ picture frame input feature map being an input feature map of the $(n+1)^{th}$ picture frame in the plurality of consecutive picture frames; and performing feature extraction on the $(n+1)^{th}$ tracked target region, to obtain an $(n+1)^{th}$ regional input feature map corresponding to the $(n+1)^{th}$ tracked target region, and calculating an $(n+1)^{th}$ weighted filter corresponding to the $(n+1)^{th}$ regional input feature map, until tracked target regions of all the consecutive picture frames are obtained.

2. The target tracking method according to claim 1, wherein the operation of calculating an $n^{th}$ weighted filter corresponding to the $n^{th}$ regional input feature map according to a correlation filter algorithm and a mean pooling constraint condition comprises:

creating a correlation filter model of the $n^{th}$ weighted filter corresponding to the $n^{th}$ regional input feature map based on a ridge regression discriminant function, a constraint condition of the correlation filter model being set to: filter weights corresponding to feature channels in pooling regions are equal;

converting the correlation filter model having the constraint condition by using an augmented Lagrange multiplier method, to generate a regional pooling correlation filter model; and optimizing the regional pooling correlation filter model by using a conjugate gradient descent method, to obtain the $n^{th}$ weighted filter corresponding to the $n^{th}$ regional input feature map.

3. The target tracking method according to claim 2, further comprising:

setting ranges of a plurality of pooling regions of the tracked target region, ranges of adjacent pooling regions being non-overlapped.

4. The target tracking method according to claim 1, wherein the operation of calculating an $n^{th}$ weighted filter corresponding to the $n^{th}$ regional input feature map according to a correlation filter algorithm and a mean pooling constraint condition comprises:

calculating, when a $1^{st}$ regional input feature map is obtained, a $1^{st}$ weighted filter corresponding to the $1^{st}$ regional input feature map according to the correlation filter algorithm and the mean pooling constraint condition and by using the $1^{st}$ regional input feature map and an expected output response of a tracked target region, the $1^{st}$ regional input feature map being an input feature map of a $1^{st}$ tracked target region corresponding to a $1^{st}$ picture frame;

calculating, when an $n^{th}$ picture frame input feature map and an $(n-1)^{th}$ weighted filter are obtained and n is greater than or equal to 2, an $n^{th}$ output response according to the correlation filter algorithm and the mean pooling constraint condition and by using the $n^{th}$ picture frame input feature map and the $(n-1)^{th}$ weighted filter, the $n^{th}$ picture frame input feature map being an input feature map of the $n^{th}$ picture frame, and the $(n-1)^{th}$ weighted filter being a weighted filter corresponding to an $(n-1)^{th}$ picture frame;

obtaining a location of the tracked target region of the $n^{th}$ picture frame, and the $n^{th}$ regional input feature map according to the $n^{th}$ output response; and calculating the $n^{th}$ weighted filter according to the correlation filter algorithm and the mean pooling constraint condition and by using an expected output response of the tracked target region, and the $n^{th}$ regional input feature map.

5. The target tracking method according to claim 1, wherein the operation of calculating an $n^{th}$ weighted filter corresponding to the $n^{th}$ regional input feature map according to a correlation filter algorithm and a mean pooling constraint condition comprises:

calculating, when an $n^{th}$ picture frame input feature map and an $(n-1)^{th}$ weighted filter are obtained and n is greater than or equal to 2, an $n^{th}$ output response according to the correlation filter algorithm and the mean pooling constraint condition and by using the $n^{th}$ picture frame input feature map and the $(n-1)^{th}$ weighted filter, the $n^{th}$ picture frame input feature map being an input feature map of the $n^{th}$ picture frame, and the $(n-1)^{th}$ weighted filter being a weighted filter corresponding to an $(n-1)^{th}$ picture frame;

obtaining a location of the tracked target region of the $n^{th}$ picture frame, and the $n^{th}$ regional input feature map according to the $n^{th}$ output response; and calculating the $n^{th}$ weighted filter according to the correlation filter algorithm and the mean pooling constraint condition and by using an expected output response of the tracked target region, the $n^{th}$ regional input feature map, and input feature maps of tracked target regions of a plurality of picture frames before the $n^{th}$ picture frame.

6. The target tracking method according to claim 5, wherein the operation of calculating the $n^{th}$ weighted filter according to the correlation filter algorithm and the mean pooling constraint condition and by using an expected output response of the tracked target region, the $n^{th}$ regional input feature map, and input feature maps of tracked target regions of a plurality of picture frames before the $n^{th}$ picture frame comprises:

performing linear weighted fusion on correlation filter loss functions of the plurality of picture frames according to the correlation filter algorithm and the mean pooling constraint condition and by using the expected output response of the tracked target region, the $n^{th}$ regional input feature map, and the input feature maps of the tracked target regions of the plurality of picture frames before the $n^{th}$ picture frame, to obtain a multi-frame based correlation filter model; and performing calculation on the multi-frame based correlation filter model, to obtain the $n^{th}$ weighted filter.

7. The target tracking method according to claim 1, wherein the operation of calculating an $n^{th}$ weighted filter corresponding to the $n^{th}$ regional input feature map according to a correlation filter algorithm and a mean pooling constraint condition comprises:

setting a binary mask for the $n^{th}$ weighted filter, to reduce a filter weight of a weighted filter corresponding to a region other than the $n^{th}$ tracked target region.

8. The target tracking method according to claim 1, wherein the operation of calculating an $n^{th}$ weighted filter corresponding to the $n^{th}$ regional input feature map according to a correlation filter algorithm and a mean pooling constraint condition comprises:

setting a regularization weight for the $n^{th}$ weighted filter, to increase a filter weight of the $n^{th}$ weighted filter in a central part of the $n^{th}$ tracked target region.

9. An electronic device, comprising a processor and a memory, the memory storing a plurality of computer programs that, when executed by the processor, cause the electronic device to perform a plurality of operations comprising:

obtaining a plurality of consecutive picture frames of a target video, and setting an $n^{th}$ tracked target region corresponding to an $n^{th}$ picture frame in the plurality of consecutive picture frames, n being a positive integer;

performing a feature extraction operation on the $n^{th}$ tracked target region, to obtain an $n^{th}$ regional input feature map corresponding to the $n^{th}$ tracked target region, the $n^{th}$ regional input feature map comprising a plurality of feature channels;

calculating an $n^{th}$ weighted filter corresponding to the $n^{th}$ regional input feature map according to a correlation filter algorithm and a mean pooling constraint condition, the $n^{th}$ weighted filter comprising a filter weight corresponding to each feature channel in the $n^{th}$ regional input feature map;

calculating an $(n+1)^{th}$ output response by using the $n^{th}$ weighted filter and an $(n+1)^{th}$ picture frame input feature map, and determining an $(n+1)^{th}$ tracked target region corresponding to an $(n+1)^{th}$ picture frame according to the $(n+1)^{th}$ output response, the $(n+1)^{th}$ picture frame input feature map being an input feature map of the $(n+1)^{th}$ picture frame in the plurality of consecutive picture frames; and performing feature extraction on the $(n+1)^{th}$ tracked target region, to obtain an $(n+1)^{th}$ regional input feature map corresponding to the $(n+1)^{th}$ tracked target region, and calculating an $(n+1)^{th}$ weighted filter corresponding to the $(n+1)^{th}$ regional input feature map, until tracked target regions of all the consecutive picture frames are obtained.

10. The electronic device according to claim 9, wherein the operation of calculating an $n^{th}$ weighted filter corresponding to the $n^{th}$ regional input feature map according to a correlation filter algorithm and a mean pooling constraint condition comprises:

creating a correlation filter model of the $n^{th}$ weighted filter corresponding to the $n^{th}$ regional input feature map based on a ridge regression discriminant function, a constraint condition of the correlation filter model being set to: filter weights corresponding to feature channels in pooling regions are equal;

converting the correlation filter model having the constraint condition by using an augmented Lagrange multiplier method, to generate a regional pooling correlation filter model; and optimizing the regional pooling correlation filter model by using a conjugate gradient descent method, to obtain the $n^{th}$ weighted filter corresponding to the $n^{th}$ regional input feature map.

11. The electronic device according to claim 9, wherein the operation of calculating an $n^{th}$ weighted filter corresponding to the $n^{th}$ regional input feature map according to a correlation filter algorithm and a mean pooling constraint condition comprises:

calculating, when a $1^{st}$ regional input feature map is obtained, a $1^{st}$ weighted filter corresponding to the $1^{st}$ regional input feature map according to the correlation filter algorithm and the mean pooling constraint condition and by using the $1^{st}$ regional input feature map and an expected output response of a tracked target region, the $1^{st}$ regional input feature map being an input feature map of a $1^{st}$ tracked target region corresponding to a $1^{st}$ picture frame;

calculating, when an $n^{th}$ picture frame input feature map and an $(n-1)^{th}$ weighted filter are obtained and n is greater than or equal to 2, an $n^{th}$ output response according to the correlation filter algorithm and the mean pooling constraint condition and by using the $n^{th}$ picture frame input feature map and the $(n-1)^{th}$ weighted filter, the $n^{th}$ picture frame input feature map being an input feature map of the $n^{th}$ picture frame, and the $(n-1)^{th}$ weighted filter being a weighted filter corresponding to an $(n-1)^{th}$ picture frame;

obtaining a location of the tracked target region of the $n^{th}$ picture frame, and the $n^{th}$ regional input feature map according to the $n^{th}$ output response; and calculating the $n^{th}$ weighted filter according to the correlation filter algorithm and the mean pooling constraint condition and by using an expected output response of the tracked target region, and the $n^{th}$ regional input feature map.

12. The electronic device according to claim 9, wherein the operation of calculating an $n^{th}$ weighted filter corresponding to the $n^{th}$ regional input feature map according to a correlation filter algorithm and a mean pooling constraint condition comprises:

calculating, when an $n^{th}$ picture frame input feature map and an $(n-1)^{th}$ weighted filter are obtained and n is greater than or equal to 2, an $n^{th}$ output response according to the correlation filter algorithm and the mean pooling constraint condition and by using the $n^{th}$ picture frame input feature map and the $(n-1)^{th}$ weighted filter, the $n^{th}$ picture frame input feature map being an input feature map of the $n^{th}$ picture frame, and the $(n-1)^{th}$ weighted filter being a weighted filter corresponding to an $(n-1)^{th}$ picture frame;

obtaining a location of the tracked target region of the $n^{th}$ picture frame, and the $n^{th}$ regional input feature map according to the $n^{th}$ output response; and calculating the $n^{th}$ weighted filter according to the correlation filter algorithm and the mean pooling constraint condition and by using an expected output response of the tracked target region, the $n^{th}$ regional input feature map, and input feature maps of tracked target regions of a plurality of picture frames before the $n^{th}$ picture frame.

13. The electronic device according to claim 9, wherein the operation of calculating an $n^{th}$ weighted filter corresponding to the $n^{th}$ regional input feature map according to a correlation filter algorithm and a mean pooling constraint condition comprises:

setting a binary mask for the $n^{th}$ weighted filter, to reduce a filter weight of a weighted filter corresponding to a region other than the $n^{th}$ tracked target region.

14. The electronic device according to claim 9, wherein the operation of calculating an $n^{th}$ weighted filter corresponding to the $n^{th}$ regional input feature map according to a correlation filter algorithm and a mean pooling constraint condition comprises:

setting a regularization weight for the $n^{th}$ weighted filter, to increase a filter weight of the $n^{th}$ weighted filter in a central part of the $n^{th}$ tracked target region.

15. A non-transitory computer-readable storage medium, storing processor-executable instructions that, when executed by one or more processors of an electronic device, cause the electronic device to perform a plurality of operations comprising:

obtaining a plurality of consecutive picture frames of a target video, and setting an $n^{th}$ tracked target region corresponding to an $n^{th}$ picture frame in the plurality of consecutive picture frames, n being a positive integer;

performing a feature extraction operation on the $n^{th}$ tracked target region, to obtain an $n^{th}$ regional input feature map corresponding to the $n^{th}$ tracked target region, the $n^{th}$ regional input feature map comprising a plurality of feature channels;

calculating an $n^{th}$ weighted filter corresponding to the $n^{th}$ regional input feature map according to a correlation filter algorithm and a mean pooling constraint condition, the $n^{th}$ weighted filter comprising a filter weight corresponding to each feature channel in the $n^{th}$ regional input feature map;

calculating an $(n+1)^{th}$ output response by using the $n^{th}$ weighted filter and an $(n+1)^{th}$ picture frame input feature map, and determining an $(n+1)^{th}$ tracked target region corresponding to an $(n+1)^{th}$ picture frame according to the $(n+1)^{th}$ output response, the $(n+1)^{th}$ picture frame input feature map being an input feature map of the $(n+1)^{th}$ picture frame in the plurality of consecutive picture frames; and performing feature extraction on the $(n+1)^{th}$ tracked target region, to obtain an $(n+1)^{th}$ regional input feature map corresponding to the $(n+1)^{th}$ tracked target region, and calculating an $(n+1)^{th}$ weighted filter corresponding to the $(n+1)^{th}$ regional input feature map, until tracked target regions of all the consecutive picture frames are obtained.

16. The non-transitory computer-readable storage medium according to claim 15, wherein the operation of calculating an $n^{th}$ weighted filter corresponding to the $n^{th}$ regional input feature map according to a correlation filter algorithm and a mean pooling constraint condition comprises:

creating a correlation filter model of the $n^{th}$ weighted filter corresponding to the $n^{th}$ regional input feature map based on a ridge regression discriminant function, a constraint condition of the correlation filter model being set to: filter weights corresponding to feature channels in pooling regions are equal;

converting the correlation filter model having the constraint condition by using an augmented Lagrange multiplier method, to generate a regional pooling correlation filter model; and optimizing the regional pooling correlation filter model by using a conjugate gradient descent method, to obtain the $n^{th}$ weighted filter corresponding to the $n^{th}$ regional input feature map.

17. The non-transitory computer-readable storage medium according to claim 15, wherein the operation of calculating an $n^{th}$ weighted filter corresponding to the $n^{th}$ regional input feature map according to a correlation filter algorithm and a mean pooling constraint condition comprises:

calculating, when a $1^{st}$ regional input feature map is obtained, a $1^{st}$ weighted filter corresponding to the $1^{st}$ regional input feature map according to the correlation filter algorithm and the mean pooling constraint condition and by using the $1^{st}$ regional input feature map and an expected output response of a tracked target region, the $1^{st}$ regional input feature map being an input feature map of a $1^{st}$ tracked target region corresponding to a $1^{st}$ picture frame;

calculating, when an $n^{th}$ picture frame input feature map and an $(n-1)^{th}$ weighted filter are obtained and n is greater than or equal to 2, an $n^{th}$ output response according to the correlation filter algorithm and the mean pooling constraint condition and by using the $n^{th}$ picture frame input feature map and the $(n-1)^{th}$ weighted filter, the $n^{th}$ picture frame input feature map being an input feature map of the $n^{th}$ picture frame, and the $(n-1)^{th}$ weighted filter being a weighted filter corresponding to an $(n-1)^{th}$ picture frame;

obtaining a location of the tracked target region of the $n^{th}$ picture frame, and the $n^{th}$ regional input feature map according to the $n^{th}$ output response; and calculating the $n^{th}$ weighted filter according to the correlation filter algorithm and the mean pooling constraint condition and by using an expected output response of the tracked target region, and the $n^{th}$ regional input feature map.

18. The non-transitory computer-readable storage medium according to claim 15, wherein the operation of calculating an $n^{th}$ weighted filter corresponding to the $n^{th}$ regional input feature map according to a correlation filter algorithm and a mean pooling constraint condition comprises:

calculating, when an $n^{th}$ picture frame input feature map and an $(n-1)^{th}$ weighted filter are obtained and n is greater than or equal to 2, an $n^{th}$ output response according to the correlation filter algorithm and the mean pooling constraint condition and by using the $n^{th}$ picture frame input feature map and the $(n-1)^{th}$ weighted filter, the $n^{th}$ picture frame input feature map being an input feature map of the $n^{th}$ picture frame, and the $(n-1)^{th}$ weighted filter being a weighted filter corresponding to an $(n-1)^{th}$ picture frame;

obtaining a location of the tracked target region of the $n^{th}$ picture frame, and the $n^{th}$ regional input feature map according to the $n^{th}$ output response; and calculating the $n^{th}$ weighted filter according to the correlation filter algorithm and the mean pooling constraint condition and by using an expected output response of the tracked target region, the $n^{th}$ regional input feature map, and input feature maps of tracked target regions of a plurality of picture frames before the $n^{th}$ picture frame.

19. The non-transitory computer-readable storage medium according to claim 15, wherein the operation of calculating an $n^{th}$ weighted filter corresponding to the $n^{th}$ regional input feature map according to a correlation filter algorithm and a mean pooling constraint condition comprises:

setting a binary mask for the $n^{th}$ weighted filter, to reduce a filter weight of a weighted filter corresponding to a region other than the $n^{th}$ tracked target region.

20. The non-transitory computer-readable storage medium according to claim 15, wherein the operation of calculating an $n^{th}$ weighted filter corresponding to the $n^{th}$ regional input feature map according to a correlation filter algorithm and a mean pooling constraint condition comprises:

setting a regularization weight for the $n^{th}$ weighted filter, to increase a filter weight of the $n^{th}$ weighted filter in a central part of the $n^{th}$ tracked target region.

* * * * *